US012358002B2

(12) United States Patent
Dudani et al.

(10) Patent No.: US 12,358,002 B2
(45) Date of Patent: Jul. 15, 2025

(54) ELECTROSTATIC PARTICLE COLLECTOR

(71) Applicant: EPFL-TTO, Lausanne (CH)

(72) Inventors: Nikunj Dudani, Lausanne (CH); Satoshi Takahama, Lausanne (CH)

(73) Assignee: EPFL-TTO, Lausanne (CH)

( * ) Notice: Subject to any disclaimer, the term of this patent is extended or adjusted under 35 U.S.C. 154(b) by 9 days.

(21) Appl. No.: 18/309,538

(22) Filed: Apr. 28, 2023

(65) Prior Publication Data

US 2023/0405602 A1 Dec. 21, 2023

(30) Foreign Application Priority Data

Jun. 10, 2022 (EP) .................................... 22178512

(51) Int. Cl.
*B03C 3/49* (2006.01)
*B03C 3/017* (2006.01)
*B03C 3/38* (2006.01)

(52) U.S. Cl.
CPC ................ *B03C 3/49* (2013.01); *B03C 3/017* (2013.01); *B03C 3/38* (2013.01); *B03C 2201/32* (2013.01)

(58) Field of Classification Search
CPC ........... B03C 3/011; B03C 3/017; B03C 3/12; B03C 3/363; B03C 3/38; B03C 3/41;
(Continued)

(56) References Cited

U.S. PATENT DOCUMENTS 6,473,172 B1 * 10/2002 Pelmulder .............. G01N 21/05 356/336
6,807,874 B2 * 10/2004 Totoki ..................... B03C 3/368 73/28.02

(Continued)

FOREIGN PATENT DOCUMENTS

WO 2009035483 A2 3/2009
WO 2012048308 A2 4/2012

OTHER PUBLICATIONS

Dixkens, J., et al., "Development of an Electrostatic Precipitator for Off-Line Particle Analysis", Aerosol Science and Technology, vol. 30, 1999, pp. 438-453.

(Continued)

*Primary Examiner* — Joseph C Rodriguez
(74) *Attorney, Agent, or Firm* — Nixon & Vanderhye PC

(57) ABSTRACT

ESP particle collector (1) for collecting particles in a particle containing gas stream, comprising an inlet section (4), a collector section (6), and an electrode arrangement (8), the inlet section comprising a flow tube (10) defining a gas flow channel (12) therein bounded by a guide wall (24) extending between an entry end (14) and a collector end (16) that serves as an inlet to the collector section (6), the entry end comprising an inlet (28) for the particle gas stream and a sheath flow inlet portion (26) for generating a sheath flow around the particle gas stream, the collector section comprising a housing (18) coupled to the flow tube, and a collector plate (20) mounted therein having a particle collection surface (23). The ESP particle collector comprises an optical measuring instrument (9) configured to transmit light through the collector plate along a centre axis (A) orthogonal or substantially orthogonal to the particle collection surface for optical analysis of the collector plate particle collection surface to measure particles collected thereon, and wherein the flow tube has a bent portion (15) such that the entry end (14) is positioned out of the centre axis A to allow the light to be transmitted through the collector plate in the direction of the centre axis and to be picked up without interfering with the gas flow or the gas inlet.

23 Claims, 22 Drawing Sheets

(58) Field of Classification Search
CPC .... B03C 3/47; B03C 3/49; B03C 3/60; B03C 3/68; B03C 3/80; B03C 2201/04; B03C 2201/24; B03C 2201/28; B03C 2201/32; G01N 2015/0046
See application file for complete search history.

(56) References Cited

U.S. PATENT DOCUMENTS

| | | | | |
|---|---|---|---|---|
| 6,881,246 | B2 * | 4/2005 | Totoki | B03C 3/011 209/127.1 |
| 7,235,123 | B1 * | 6/2007 | Biegelsen | G01N 1/2202 204/674 |
| 7,416,902 | B2 * | 8/2008 | Pletcher | B03C 3/36 422/50 |
| 8,044,350 | B2 | 10/2011 | Chen et al. | |
| 8,372,183 | B2 * | 2/2013 | Doucette | B03C 3/70 96/26 |
| 9,157,871 | B2 * | 10/2015 | Hong | G01N 23/02 |
| 2003/0213366 | A1 * | 11/2003 | Totoki | B03C 3/025 96/15 |
| 2012/0012744 | A1 * | 1/2012 | Wang | G01N 15/1459 250/287 |
| 2016/0116389 | A1 * | 4/2016 | Cooper | G01N 15/0227 356/340 |
| 2024/0024897 | A1 * | 1/2024 | Dudani | B03C 3/361 |

OTHER PUBLICATIONS

Han, Taewon T., et al., “Design and development of a self-contained personal electrostatic bioaerosol sampler (PBES) with a wire-to-wire charger”, Aerosol Science and Technology, vol. 51, No. 8, 2017, pp. 903-915.
Heiszler, Manfred, “Analysis of streamer propagation in atmospheric air”, Iowa State University, Retrospective Theses and Dissertations, 1971, 229 pages.
Jodzis, Sławomir, et al., “Kinetic and Energetic Analysis of the Ozone Synthesis Process in Oxygen-fed DBD Reactor. Effect of Power Density, Gap vol. and Residence Time”, Ozone: Science & Engineering, vol. 38, No. 2, 2016, pp. 86-99.
Preger, Calle, et al., “Predicting the deposition spot radius and the nanoparticle concentration distribution in an electrostatic precipitator”, Aerosol Science and Technology, vol. 54, No. 6, 2020, pp. 718-728.
Rees, J., et al., “Electrical breakdown in gases”, High Voltage Engineering: Fundamentals, Chapter 5, 1973, pp. 281-366.
Extended European Search Report for EP Application No. 22178512.4 dated Nov. 25, 2022, 9 pages.

* cited by examiner

Effect of changing sheath position ($lim_s$) on the collection performance and spatial uniformity of deposition (10a) $lim_s = 1$ (10b) $lim_s = 0.5$.

Effect of changing $ratio_1$ on the collection performance and spatial uniformity of deposition. (a) $ratio_1 = 1$ (b) $ratio_1 = 4$

(i) Average electric field strength (normalized by maximum) over the collection disc;

(ii) Variation of the electric field strength (normalized by maximum) over the collection disc, both for different $ratio_1$ and $ratio_3$ values Effect of $ratio_2$ on the electric field strength over and around the collection disc. Here $ratio_1$ was fixed at a value of 2.

Example flow limits for L3 = 12.7 mm, and an electric field strength of 1 kV/mm (i) Collection disc size (L3) = 12.7 mm and sheath position ($lim_s = 0.2$);

(ii) (Collection disc size (L3) = 12.7 mm and sheath position ($lim_s = 0.4$);

(iii) Collection disc size (L3) = 127 mm (i.e. 10 times) and sheath position ($lim_s = 0.4$).

FIG. 13

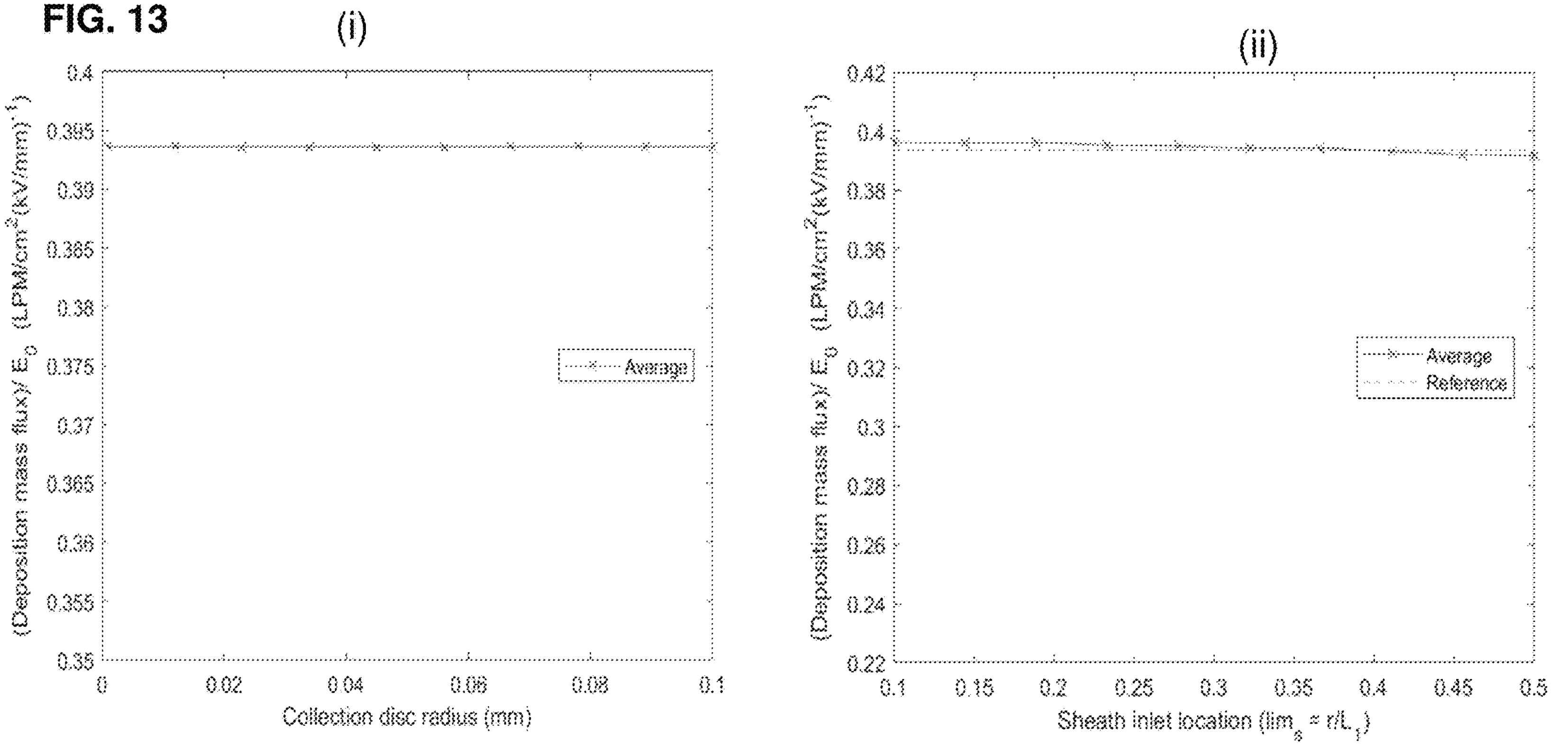

(i) The average collection volume flux vs. the collection disc radius (each value at a collection disc radius is obtained by averaging the values for different $lim_s \times ratio_3$ values);

(ii) The average collection volume flux vs. sheath starting position for a fixed collection disc radius L3 = 12.7 mm (each value at a sheath position is obtained by averaging the values for different $lim_s \times ratio_3$ values).

(i) (ii)

Extent of the particle focusing (drift) towards the center line because of electrode 1 based on different $ratio_3$ and $lim_s$ values (i) Extent of drift (expressed as percentage)

(ii) Size-based variation (expressed as normalized median absolute deviation) in the final position after drift only i.e. does not include particle collection change.

Upper and lower limits on collection disc size (y-axis) over which the analytical model would be valid for different $ratio_3$ values (x-axis) for different sheath positions: $(i)\ lim_s = 0.1\ (ii)\ lim_s = 0.2\ (iii)\ lim_s = 0.4\ (iv)\ lim_s = 1$.

ELECTROSTATIC PARTICLE COLLECTOR

CROSS-REFERENCE TO RELATED APPLICATIONS

This application claims priority to EP patent application Ser. No. 22/178,512.4 filed Jun. 10, 2022, the entire contents of which are hereby incorporated by reference.

FIELD OF THE INVENTION

This invention relates to an electrostatic particle collector, for collecting particles carried in a gas, for instance airborne particles. The invention relates in particular to a particle collector for obtaining samples of particles carried in a gaseous environment, for instance for measuring or characterizing particles that may represent contaminants, pollen, pollutants and other substances in air or in other gaseous environments.

BACKGROUND OF THE INVENTION

Various particle collectors using electrostatic charges to collect particles are known. These devices are known as electrostatic precipitators (ESP) which may either have a general inlet gas flow that is substantially parallel to the electrostatic collection surface (linear ESP), or generally orthogonal to the collection surface (radial ESP) whereby the gas flows radially outwards as it impinges against the collection surface.

One of the drawbacks of linear ESP systems is the generally lower collection efficiency and higher particle size dependency in deposited position compared to radial ESP systems. All conventional ESP's however suffer from one or more drawbacks including: low spatial uniformity in deposition pattern; high size dependency in deposition pattern such that particles in different size are not uniformly distributed; poor collection efficiency in that the yield of particles collected is low compared to the particles in the gas stream; low collection mass flux leading to slow particle accumulation; and high chemical interference whereby reactive molecules such as ozone, $NO_x$ and others are produced from the high electric field strength of the ESP electrodes due to corona discharge.

In particle sampling applications, it is important not to generate reactive gases that could modify the properties of collected particles (described herein as chemical interference). For the sampling of various particle containing gases, for instance with spectroscopic measurement devices, it is advantageous to have a uniform spatial distribution with low size dependence such that the observation of the collection area is representative of the particles contained in the sampled gas. In order to perform sampling rapidly with high accuracy, it is also advantageous to have a high particle collection efficiency over a short duration.

Sampling applications may include sample collections for spectroscopy and spectrometry or other types of chemical analyses for studies in air quality, atmospheric science, or industries that involve generation of particles such as in manufacturing industries, construction and e-cigarettes where customer safety is a consideration. The aforementioned advantageous properties of ESP's would also be useful in seeding applications for subsequent epitaxial film growth of crystals that can prove useful in membrane technology and nanocrystal technology. Further applications that use particle collection with ESP systems may include biological samples needed for optical analysis or other in vitro studies. ESP particle collection may also be used in certain coating applications.

An orthogonal electrostatic particle collection device comprising sheath flow is known from U.S. Pat. No. 8,044,350B2, however the particles precipitated on the electrode in the disc precipitator portion are not observed, rather it is the particles that pass through the precipitator that are counted. The particle size distribution may be obtained by stepping the precipitation voltage through the entire voltage range and measuring the electrical charges associated with penetrating particles. The purpose of the precipitator is thus to act as a cut-off "filter" that retains particles above a certain size and allow particles below said threshold to pass through, such cut-off threshold being dependent inter alia on the voltage applied across the electrodes which can be varied in order to perform a full analysis of the particles in the gas flow. In such a classification system, the distribution of particles on the electrode in the disc precipitator is unimportant and the problem of having a uniform distribution which is not particle size dependent is not considered.

SUMMARY OF THE INVENTION

In view of the foregoing, an object of the invention is to provide an electrostatic particle collector apparatus for automated optical analysis of the collected particles that has a high spatial uniformity in the deposition pattern with low size dependence of the particles and low chemical interference.

It is advantageous to provide a particle collector that has a high collection efficiency.

It is advantageous to provide a particle collector that has a high collection mass flux enabling rapid particle accumulation for a given period of time.

It is advantageous to provide a particle collector that is economical to manufacture and operate.

It is advantageous to provide a particle collector that is compact.

It is advantageous to provide a particle collector that is easy to operate and maintain.

Objects of this invention have been achieved by providing a particle collector according to claim 1.

Disclosed herein is an ESP particle collector for collecting particles in a particle containing gas stream, comprising an inlet section, a collector section, and an electrode arrangement, the inlet section comprising a flow tube defining a gas flow channel therein bounded by a guide wall extending between an entry end and a collector end that serves as an inlet to the collector section, the entry end comprising an inlet for the particle gas stream and a sheath flow inlet portion for generating a sheath flow around the particle gas stream, the collector section comprising a housing coupled to the flow tube, and a collector plate mounted therein having a particle collection surface. The ESP particle collector comprises an optical measuring instrument configured to transmit light through the collector plate along a centre axis A orthogonal or substantially orthogonal to the particle collection surface for optical analysis of the collector plate particle collection surface to measure particles collected thereon, and wherein the flow tube has a bent portion such that the entry end is positioned out of the centre axis A to allow the light to be transmitted through the collector plate in the direction of the centre axis and to be picked up without interfering with the gas flow or the gas inlet.

In an advantageous embodiment, the flow tube comprises a first portion arranged along an initial inclined axis (Gi)

connected via the bent portion to a second portion arranged along the centre axis (A) connected to the collector section 6, an angle of inclination (β) of the initial axis (Gi) relative to the centre axis (A) being less than 60°, preferably less than 40°, more preferably less than 30°, for instance in range of 10° to 25°.

In an advantageous embodiment, a length (d2) of the second portion of flow tube is in a range of 0.3D to 0.7D, D being an overall length of the flow tube.

In an advantageous embodiment, the optical measuring instrument comprises a spectroscopic optical instrument comprising a light source arranged to project light through the collector plate and a light detector arranged to capture the light transmitted through the collector plate from the light source.

In an advantageous embodiment, the ESP particle collector further comprises a cleaning system comprising one or more nozzles arranged to direct one or more jets of a cleaning gas on the collector plate particle collection surface.

In an advantageous embodiment, the collector plate is mounted on a motorized movable platform to move the collector plate away from the measurement position for the cleaning operation.

In an advantageous embodiment, the ESP particle collector further comprises a purge gas source connected fluidically via a valve to the gas inlet, for instance the sheath gas flow inlet, configured to purge the inlet section and collector section gas flow channels prior to the measurement cycle.

In an advantageous embodiment, the ESP particle collector further comprises a controller connected to various devices of the ESP particle collector allowing the automated measurement of collected particles, said devices including some or all of: the particle charger; gas pumps as for the particle gas flow, for the sheath gas flow, for the outlet; a purge gas valve, a motorized platform for moving the collector plate; a cleaning system; and the optical measuring instrument.

In an advantageous embodiment, the ESP particle collector, in a variant, comprises a pair of devices each having said inlet and collector sections and associated flow tubes, coupled optically to a common said measuring instrument.

In an advantageous embodiment, the electrode arrangement comprises at least a base electrode positioned below the collection surface and a counter-base electrode positioned at a separation distance L2 above the collection surface such that an electrical field is generated between the electrodes configured to precipitate said particles on the collection surface, wherein the electric field is in a range of 0.1 kV per mm to 1.5 kV per mm, with an absolute voltage on any said electrode that is less than 10 kV, and wherein a ratio ratio_1 of a radius L1 of said inlet at the collector end divided by said separation distance L2 is in a range of 0.8 to 1.2.

In an advantageous embodiment, the base electrode preferably has an annular shape that permits the optical beam to pass through the centre.

In an advantageous embodiment, the collector plate is mounted on a collector plate holder, removably mounted in the housing to allow the collector plate to be optically analysed by an external instrument for measurement of particles collected thereon.

In an advantageous embodiment, the ESP particle collector further comprises a particle measurement instrument arranged in the housing above or below the particle collection surface to measure the particles collected on the particle collection surface.

In an advantageous embodiment, a ratio_2 (L1/L4) of the radius L1 of said inlet divided by a radius L4 of the base electrode is less than 1.

In an advantageous embodiment, said ratio_2 (L1/L4) is less than 0.7, for instance 0.5 or lower.

In an advantageous embodiment, a ratio $lim_s$ (L5/L1) of an inner radius Ls of the said sheath flow relative to the inlet radius L1 is less than 0.6.

In an advantageous embodiment, said ratio $lim_s$ (Ls/L1) is in a range of 0.2 to 0.5.

In an advantageous embodiment, a ratio ratio_3 of the radius L1 of said inlet divided by a radius L3 of the collector plate (L1/L3) is in a range of 0.05 to 20.

In an advantageous embodiment, said ratio ratio_3 (L1/L3) is in a range of 0.1 to 5.

In an advantageous embodiment, the electrode arrangement further comprises a tube electrode around the collector end forming the inlet to the collector section.

In an advantageous embodiment, the sheath flow inlet portion comprises a sheath flow gas inlet, a gas chamber and an annular sheath flow gas outlet surrounding the centre of the flow channel and configured to generate an annular sheath flow along the guide wall of the flow channel surrounding the particle gas stream.

In an advantageous embodiment, the ESP particle collector further comprises a particle charger arranged upstream of the inlet section configured to electrically charge the particles of the gas stream entering the inlet section.

In an advantageous embodiment, the particle charger is configured to impart a charge on the particles contained in the gas stream in a range of about 1 elementary charge per 10 nm (1 nm=$10^{-9}$ m) to about 1 elementary charge per 50 nm diameter of a particle.

In an advantageous embodiment, the particle charger is configured to impart a charge on the particles contained in the gas stream in a range of about 1 elementary charge per 10 nm diameter to about 1 elementary charge per 30 nm diameter of a particle.

In an advantageous embodiment, the collector plate is made of a transparent conductive or semi-conductor material.

Further objects and advantageous aspects of the invention will be apparent from the claims, and from the following detailed description and accompanying figures.

BRIEF DESCRIPTION OF THE DRAWINGS

The invention will now be described with reference to the accompanying drawings, which by way of example illustrate embodiments of the present invention and in which:

FIG. 8*a* illustrates a ratio 1 and FIG. 8*b* a ratio of 4;

FIG. 13 illustrates an example of (i) average collection volume flux vs. the collector plate radius (each value at a collector plate radius is obtained by averaging the values for different $lim_s$x$ratio_3$ values (dotted line in FIG. 11(*iii*)). (ii) The average collection volume flux vs. sheath starting position for a fixed collector plate radius L3=12.7 mm (each value at a sheath position is obtained by averaging the values for different $lim_s$x$ratio_3$ values).

DETAILED DESCRIPTION OF EMBODIMENTS OF THE INVENTION

Figure 1:
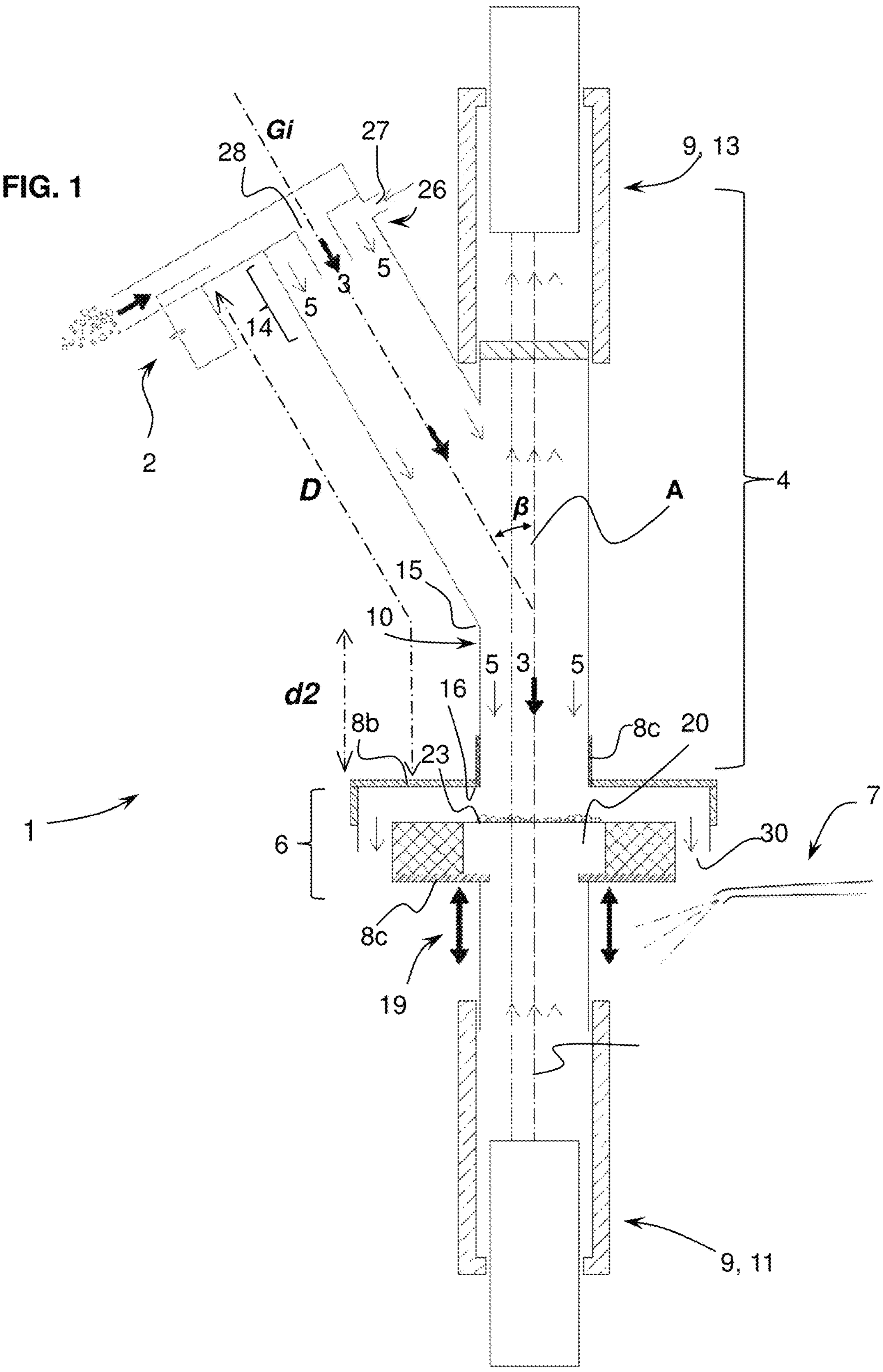
FIG. 1 is a cross-sectional schematic simplified view of a particle collector according to an embodiment of the invention.

Referring to the figures, an ESP particle collector 1 according to embodiments of the invention comprises an inlet section 4, a collector section 6 including a collector plate 20, an electrode arrangement 8, and an optical measuring instrument 9 for automated measurement of the particles collected on the collector plate. The particle collector may further comprise a particle charger 2 arranged upstream of the inlet section 4 configured to electrically charge the particles of the gas stream entering the inlet section 4.

The particle charger is configured to impart a small charge on the particles contained in the gas stream to be sampled preferably in a range of about 1 elementary charge per 10 nm (1 nm=$10^{-9}$ m) to about 1 elementary charge per 50 nm diameter of a particle. Preferably the charge is in a range of 1 elementary charge per 10 nm diameter to about one elementary charge per 40 nm diameter for instance around 1 elementary charge per 20 nm diameter. The relatively small charge allows the particles to be charged with a low generation of reactive species such as ions and radicals such as ozone, in order to ensure low chemical interference on the particles contained in the gas stream. Various per se known particle chargers may be used, such known chargers using field charging, diffusion charging, or ultraviolet charging, provided that they have a low reactive species generation on the particles in the gas stream.

An example of a charger that may be used for the invention is for instance described in Han [5] which describes a wire-wire charger with a low ozone production.

The charging of the particle stream, although optional in embodiments of the invention, advantageously assists in improving uniforms spatial distribution of particles on the collector plate.

According to an aspect of the invention, the optical measuring instrument 9 is configured to transmit light through the collector plate along an axis A orthogonal or substantially orthogonal to a particle collection surface 23 on the collector plate. The optical measuring instrument 9, in a preferred embodiment, comprises a spectroscopic optical instrument comprising a light source 11 arranged to project light through the collector plate 20 and a light detector 13 arranged to capture the light transmitted through the collector plate 20 from the light source.

Figure 1A:
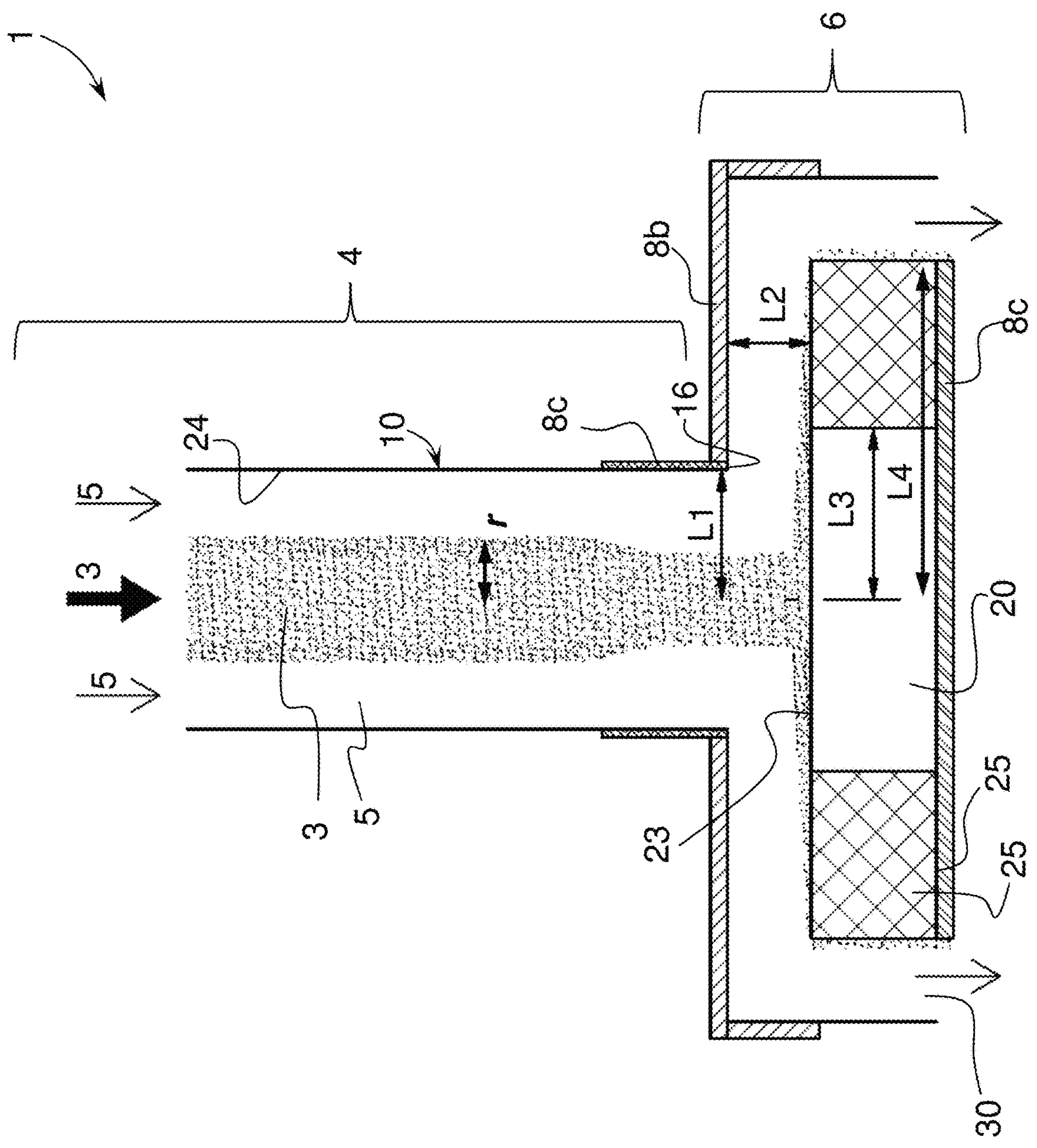
FIG. 1*a* is a cross-sectional schematic simplified view of a collector section of the particle collector of FIG. 1.
Figure 1B:
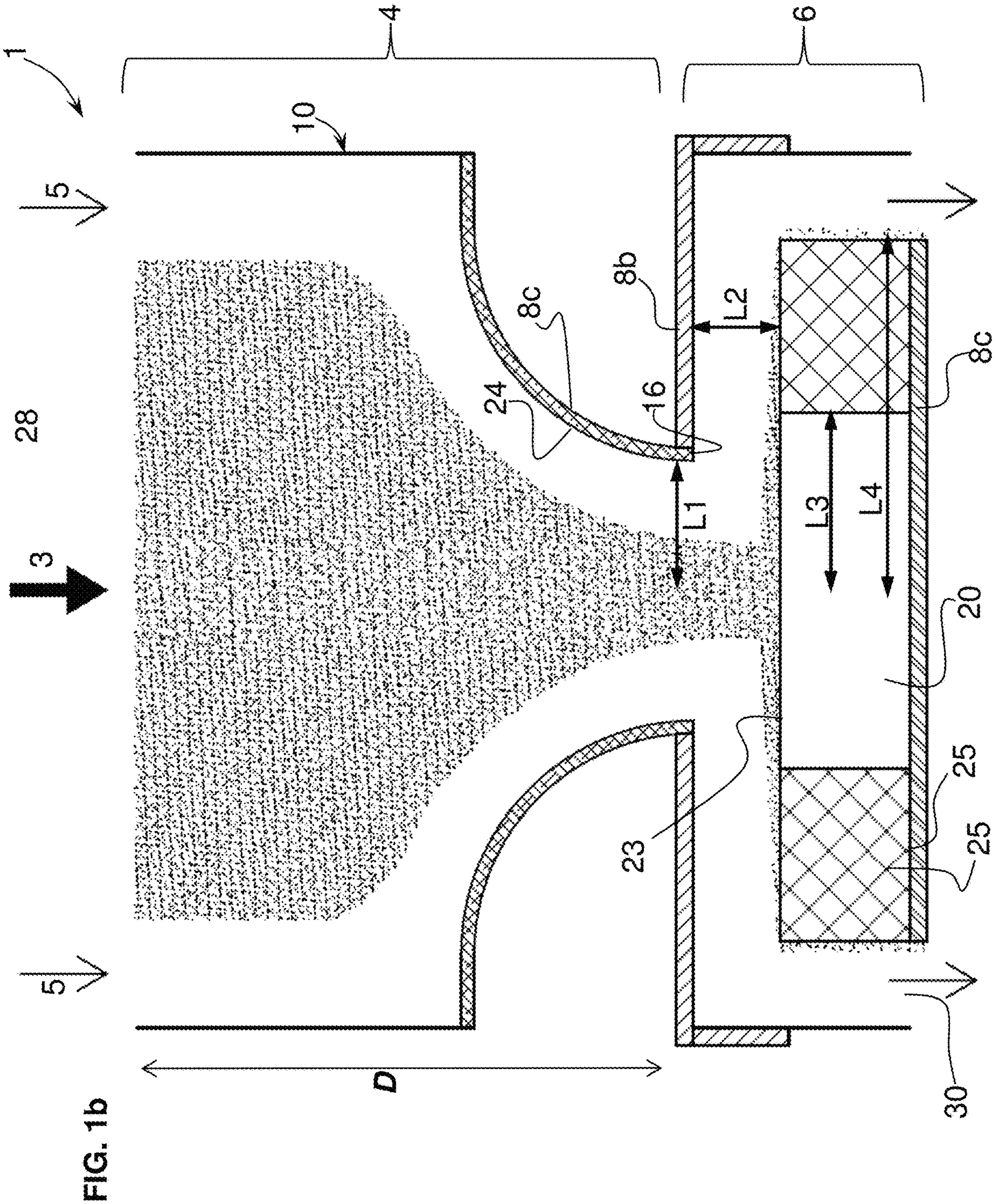
FIG. 1*b* is a view similar to FIG. 1*a* of another embodiment.
Figure 1C:
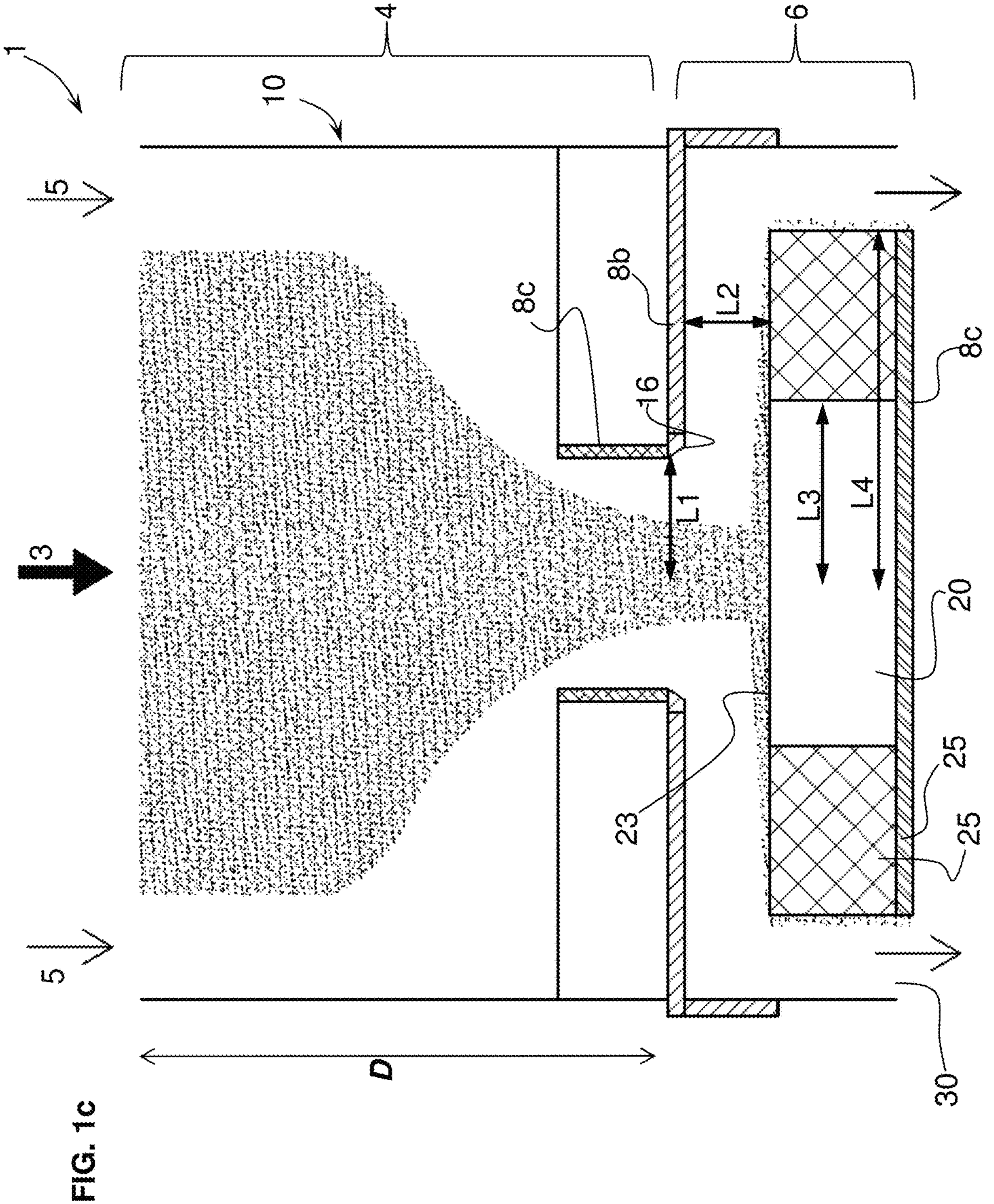
FIG. 1*c* is a view similar to FIGS. 1*a* and 1*b* of yet another embodiment.
Figure 2:
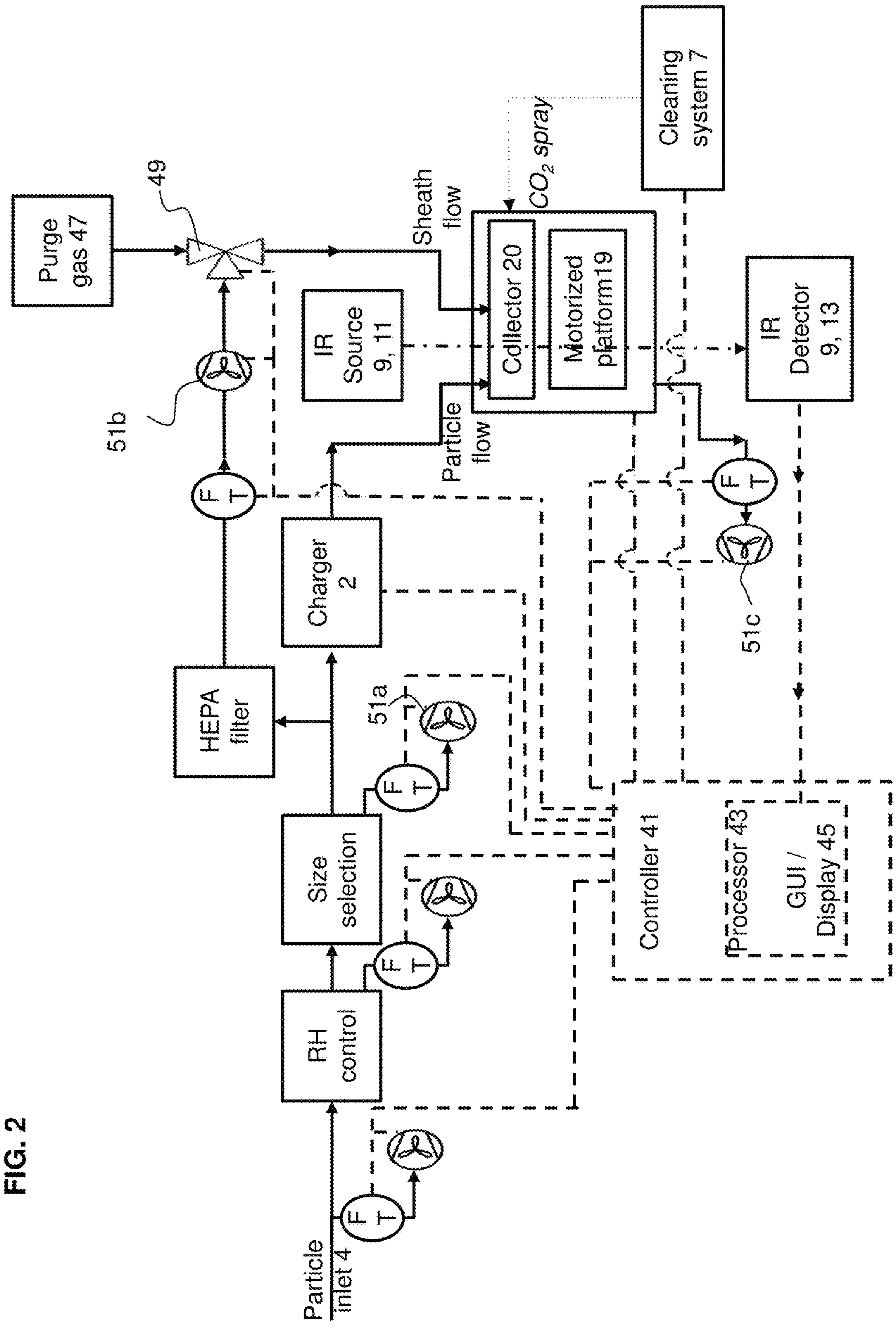
FIG. 2 is a schematic block diagram of a particle collector according to an embodiment of the invention.

The inlet section 4 comprises a flow tube 10 defining a gas flow channel 12 therein bounded by a guide wall 24 that is preferably of a generally axisymmetric shape at the collector end section. The flow tube at the collector end section may be generally cylindrical as illustrated in embodiment of FIG. 1*a* or may have other axisymmetric shapes for instance as illustrated in FIGS. 1*b* and 1*c*. The flow tube may however also have non-axisymmetric cross-sectional profiles such as polygonal (square, pentagon, hexagon or other polygons).

The flow tube 10 extends between an entry end 14 and a collector end 16 that serves as a gas inlet to the collector section 6. According to an aspect of the invention, the flow tube has bent portion 15 such that the entry end 14 is positioned out of the centre axis A to allow the light to be transmitted through the collector plate in the direction of the centre axis and to be picked up without interfering with the gas flow or the gas inlet. The gas thus flows in a first portion along an initial inclined axis Gi before joining a second portion along the centre axis A and then entering the collector section 6. The angle of inclination β of the initial axis Gi relative to the centre axis A is less than 60°, preferably less than 40°, more preferably less than 30°, for instance between 10° and 25°, the length d2 of the second portion of flow tube is preferably in a range of 0.3D to 0.7D, D being the overall length of the flow tube, in order to ensure a substantially axisymmetrical developed flow of the gas particles and sheath at the collector section 6.

Figure 3B:
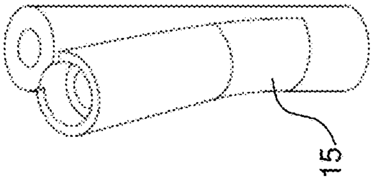
FIG. 3*b* is a perspective view of the portion of FIG. 3*a;*
Figure 3A:
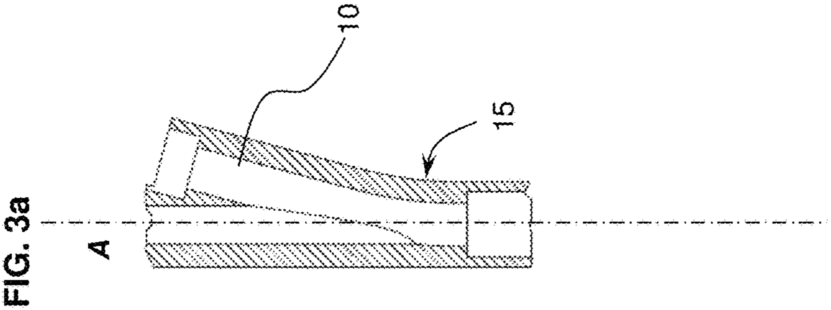
FIG. 3*a* is a cross-sectional view of a portion of a variant of the gas inlet section of FIG. 3.
Figure 3:
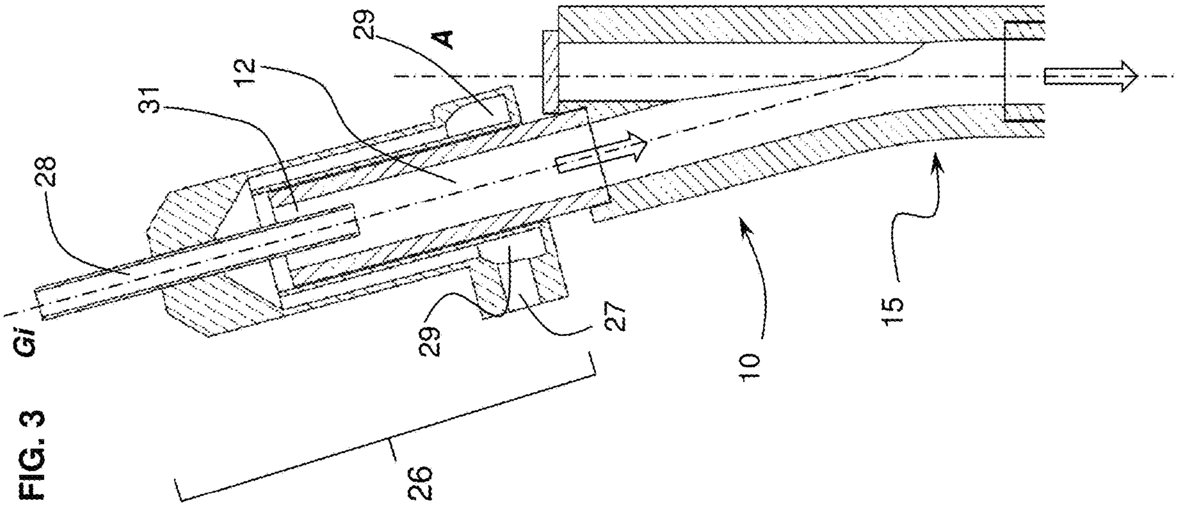
FIG. 3 is a cross-sectional view of a gas inlet section of a particle collector according to an embodiment of the invention.
Figure 4B:
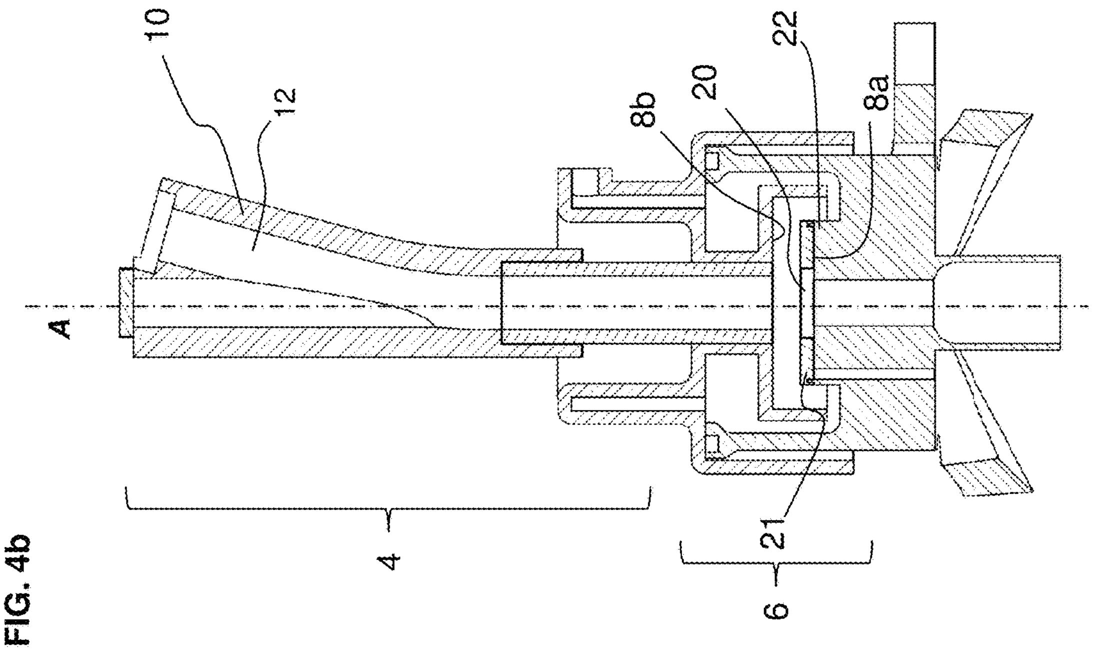
FIG. 4*b* is a cross-sectional view of the particle collector section of FIG. 4*a;*
Figure 4A:
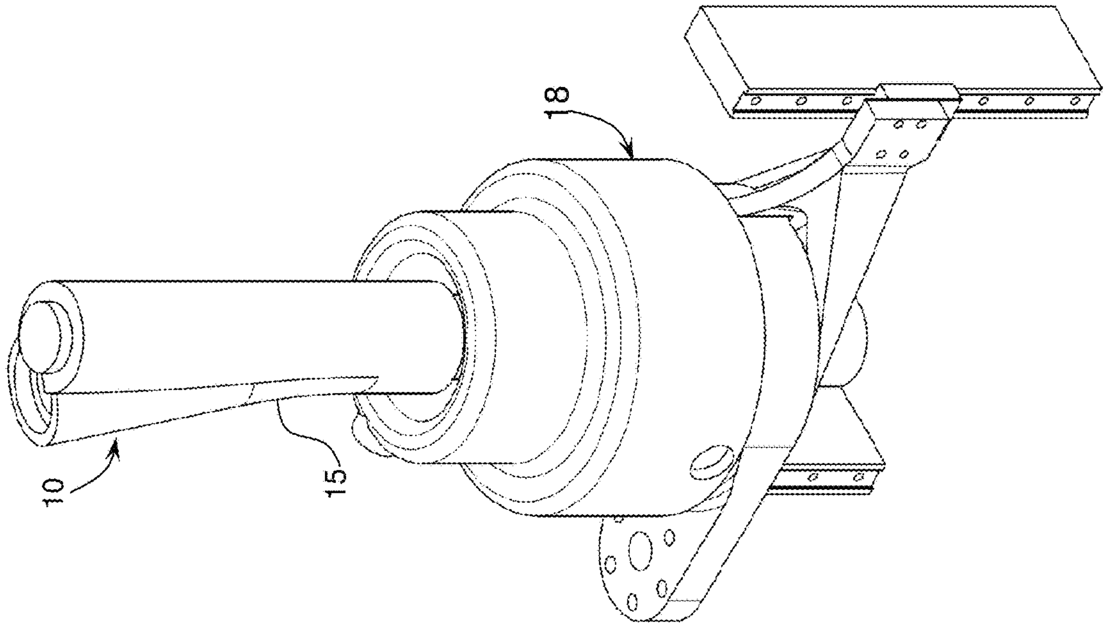
FIG. 4*a* is a perspective view of a collector section of a particle collector according to an embodiment of the invention.
Figure 4C:
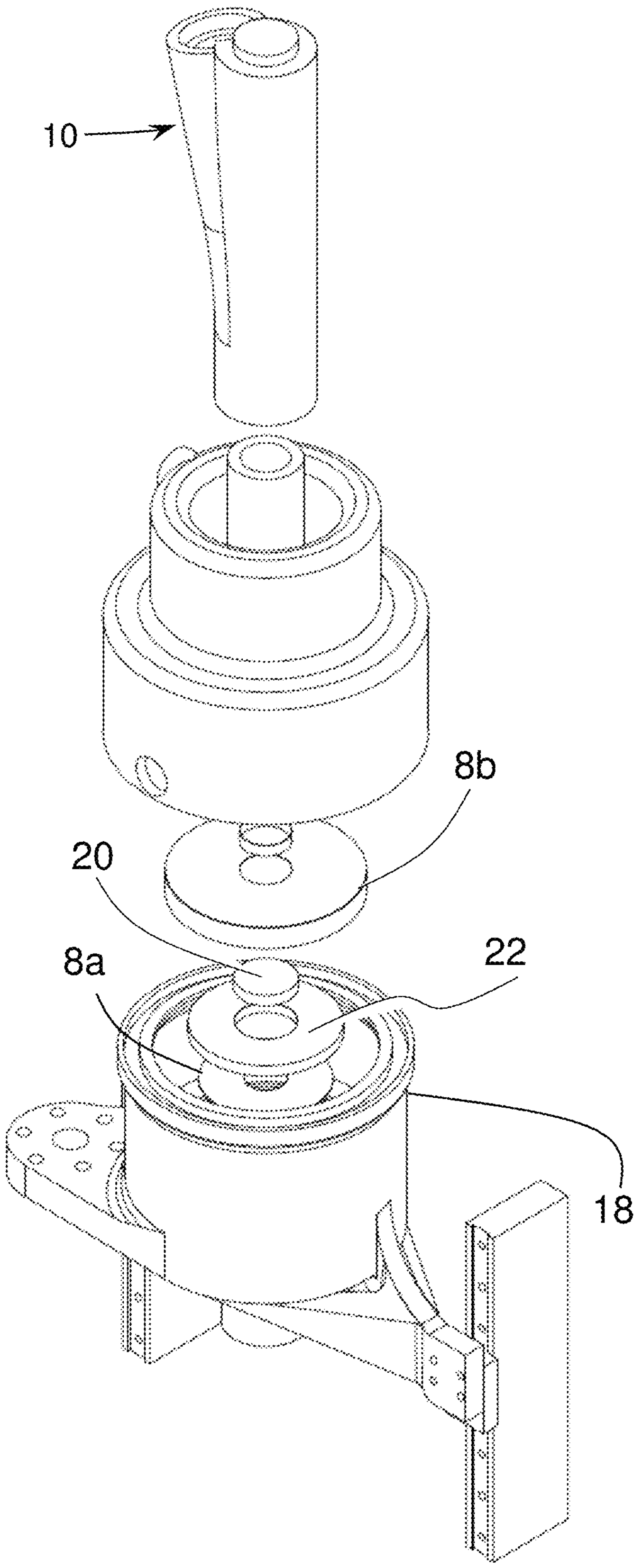
FIG. 4*c* is a perspective exploded view of the particle collector section of FIG. 4*a;*

The bent portion 15 is preferably curved as illustrated in FIGS. 3*a* and 3*b* to reduce turbulence and ensure that the gas flow is substantially laminar while maintaining a similar distribution of the streamlines about the centre line.

The entry end 14 comprises an inlet 28 for the particle gas stream and a sheath flow inlet portion 26 for generating a sheath flow around the particle gas stream. By the term "particle gas stream" it is meant the gas stream containing the particles to be collected in the collector section 6.

The sheath flow inlet portion 26 comprises a sheath flow gas inlet 27, a gas chamber 29 and a sheath flow gas outlet 31 surrounding the centre of the flow channel 12 and configured to generate and annular sheath flow along the wall 24 of the flow channel 12 surrounding the particle gas flow. The chamber 29 serves to contain a volume of gas with a low or essentially no pressure gradient within the chamber with respect to the sheath gas inlet, such that the radial nozzle defining the sheath flow outlet 31 generates an even circumferential sheath flow.

The flow rates of the sheath flow and particle gas flow may be calibrated such that the two gas streams have laminar flow properties and the boundary layer between the sheath flow stream and particle gas stream remains laminar substantially without mixing. The gas flow streams are configured such that the Reynolds number is below 2200, preferably below 500, for instance around 200.

The flow tube 10 has an overall length D that is configured to ensure that the velocity of the sheath gas stream and particle gas stream at the interface therebetween accelerates such that the velocity profile of the gas stream within the flow channel collector end is a substantially continuous single rounded profile with a substantially flatter profile compared to the gas stream as the entry end. In effect, at the sheath flow outlet, the laminar flow profile is substantially parabolic and joins the particle gas stream at the boundary interface with a velocity close to zero that accelerates as the gas stream flows away from the sheath flow outlet.

The sheath flow separating the particle gas flow from the guide wall 24 reduces or avoids deposition of particles on the guide wall 24 and has further advantages in improving spatial uniformity of the particle deposition in the collector section 6, reducing also chemical interference, reducing size dependence in the collection and improving collection efficiency. This is not only because it reduces the gradient in axial velocity of the particle gas stream that flows on to the collector plate, but also due to the separation of the gas stream from the flow channel walls, it reduces interference of the charge particles with the flow channels walls.

The collector section 6 comprises a housing 18 coupled to the flow tube 10, and the collector plate 20 mounted therein on a collector plate holder 22.

The collector plate comprises a transparent disc, for instance made of a crystal such as a Silicon, Zinc Selenide, or Germanium crystal, for optical analysis using for instance infrared spectroscopy. The collector disc may be removably mounted within the housing for cleaning, replacement, or for placement in an external measurement instrument for analysing the particles deposited on the collector plate 20 as a complementary measurement to the internal measurement. The collector plate 20 may comprise a filler material 21 arranged around the collector plate 20. The gas stream flow over the collector plate is thus defined not only by the collector end 16 of the flow tube 10 but also the radius of the collector plate 20 and the filler material 21 therearound.

The ESP particle collector 1 may advantageously comprise a cleaning system 7 comprising one or more nozzles 17 arranged to direct one or more jets of a cleaning fluid on the collector plate particle collection surface 23 of the collector plate to blow away particles on the collection surface. In an embodiment, the collector plate may be mounted on a motorized movable holder or platform 19 to lower the housing 18 and the collector plate 20 away from the counter-base electrode 8*b* for the cleaning operation. The cleaning system may be operated at the end of a measurement cycle, or at defined intervals. The lowering of the housing 18 using motorized movable holder or platform 19 can further allow for insertion or removal of collector plate 20 or collector plate holder 22.

The cleaning fluid may for instance be liquid/gas mixture of $CO_2$ with suspended solids, or other preferably inert gases such as argon or nitrogen. The cleaning fluid may be supplied from a dedicated cleaning fluid source, or may be supplied from a filtered purge gas that would improve the portability of the system.

The ESP particle collector 1 may further comprise a purge gas source 47 connected fluidically via a valve 49 to the gas inlet, for instance the sheath gas flow inlet, to purge the inlet section and collector section gas flow channels prior to a new particle collection cycle. The purge gas source may be operated at the beginning of a measurement cycle, or at defined intervals, and may be operated prior to or simultaneously with the cleaning system. The purge gas may for instance be argon or nitrogen, or other inert gases that do not interfere with mid-IR wavelengths. The purge gas may also be dry air supplied from a purge-gas generator, which comprises self-regenerating columns of molecular sieves that only require pressurized air and electricity. This allows to remove the need for supplying and replacing gas cylinders.

The controller 41 is connected to the various automated devices of the ESP particle collector allowing the automated measurement of collected particles. The controller may be for instance be connected to all or some of the following components of the ESP particle collector: the particle charger 2, various gas pumps 51*a*, 51*b*, 51*c* such as for the particle gas flow, for the sheath gas flow, for the outlet, the purge gas valve 47, the motorized platform 19, the cleaning system 7, and the measuring instrument 9. The ESP particle collector may further include a graphical user interface including a display 45 for inputting data or commands and for displaying measurement results and control information.

The electrode arrangement 8 comprises at least a base electrode 8*a* positioned adjacent or on an underside 25 of the collector plate 20, below the collection surface 23 where particles are deposited. The base electrode may have a central orifice to allow the light of the measurement instrument to pass through the collector plate. The electrode arrangement 8 further comprises a counter-base electrode 8*b* positioned at a certain separation distance L2 above the collector plate 20 and which may be arranged substantially parallel to the base electrode 8*a* such that an electrical field is generated between the electrodes 8*a*, 8*b*.

In embodiments, the electrode arrangement may optionally further comprise a tube electrode 8*c* around the collector end 16 forming the inlet to the collector section 6. The tube electrode 8*c* may be at the same voltage as the counter-base electrode 8*b* or at a different voltage therefrom separated by an insulating element from the counter-base electrode 8*b*.

It may be noted that the various electrodes may be at a certain voltage with respect to ground or one of the electrodes may be connected to ground and the other at a potential different from ground.

The inlet channel at the collector end has a radius defined as L1. The collector plate has a radius defined as L3. The base electrode has a radius defined as L4. The distance between the counter-base electrode 8*a* and the collector plate 20 has a separation distance defined as L2.

At least two ratios, namely

- the ratio L1/L2 between the inlet channel collector end radius L1 and counter-base electrode to collector plate separation distance L2 named hereinafter for convention as ratio_1, and
- the ratio L1/L3 between the inlet channel and radius L1 and the collection plate radius L3 named hereinafter by convention ratio_3 are within certain ranges that according to an aspect of the invention allow to provide a high spatial uniformity and low size dependence, as well as a high collection efficiency of particles to be sampled on the collector plate 20.

An optimal ratio_1 (L1/L2) affects the variation in the electric field under the inlet tube which may be optimized to improve spatial uniformity and collection efficiency.

A lower bound value for an optimal ratio_3 may be constrained by any value where impaction affects the final deposition pattern, however collection mass flux is generally higher if this ratio is more than 1. An upper bound value may be constrained by a fixed limit on operating voltage (and maximum electric field strength) and on $\text{ratio}_1$ above, for example by, $$\text{ratio}_3 \leq \frac{V_{max}}{E_{max}} \times \frac{\text{ratio}_1}{\text{collection disc radius}}$$

The upper bound value may also be constrained by a desired efficiency, for example by, $$\text{ratio}_3 \leq \frac{1}{\text{efficiency} \times \text{radial sheath position lim\_s}}.$$

Advantageously, another ratio L1/L4 of interest for high spatial uniformity and low chemical interference is a ratio between the radius L1 of the inlet channel collector end and the base electrode radius L4, named hereinafter by convention as ratio_2. The ratio_2 controls the electric field concentration effects on the collector plate's edges. An optimal ratio_2 may thus serve to improve spatial uniformity and lowers the electric field strengths in some regions, in particular to lower the variation in electric field strength under the inlet tube.

According to an aspect of the invention, the ratio_1 (L1 divided by L2) is in a range of 0.3 to 1.8, preferably in a range of 0.8 to 1.2.

According to an aspect of the invention, the ratio_2 (L1/L4) is less than 1, preferably less than 0.7, for instance 0.5 or lower.

According to an aspect of the invention, the ratio_3 (L1 divided by L3) is preferably in a range of 0.05 to 20, preferably in a range of 0.1 to 5.

The electric field generated between the base electrode 8*a* and counter-base electrode 8*b* is preferably in a range of 0.1 kV per mm to 3 kV per mm, preferably from 0.5 kV per mm to 1.5 kV per mm for instance around 1 kV per mm, with an absolute voltage on any electrode that is less than 10 kV, to reduce chemical interference while ensuring high collection efficiency.

The inner radius Ls of the sheath flow relative to outer radius L1 of the sheath flow at the collector end 16 forming the inlet to the collector section 6, is defined herein as ratio $\text{lim}_s$ (Ls/L1). Ratio $\text{lim}_s$ is in a range of 0.1 to 0.9, preferably in a range of 0.1 to 0.6, for instance around 0.4, to ensure a sheath flow layer sufficient to provide a good separation between the gas particle stream and the flow channel wall 24 as well as ensuring that the particle gas stream impinging upon the collector plate 20 allows optimal uniform spatial distribution of the particles on the collector plate.

The above mentioned ratios are important in achieving the following advantages of embodiments of the invention:

| Advantage | Features |
|---|---|
| Spatially uniform deposition pattern | Sheath flow: the method of introducing sheath flow described herein results in high spatial uniformity in the deposition pattern. Defining the geometric length ratios greatly reduces effect of impaction with larger inlet tube radius size. The absence of electrodes/ sheets in the inlet flow tube avoids disturbance in the gas flow stream. |
| Low size-dependence | Defining the geometric length ratios: mainly, increasing the inlet tube radius L1 relative to collection plate radius L3 will lower particle size dependence. However, this could generally mean a loss of collection efficiency. Hence, the value is limited in the range where the collected mass flux is higher on the collection plate. Sheath flow: This is an artificial method of tuning this ratio described above, as even for a larger tube, a sheath flow limits the incoming particles to a certain radial distance. |

-continued

| Advantage | Features |
|---|---|
| Low Chemical interference | Defining the geometric length ratios: Define separation distance L2 required to maintain a low electric field strength, and keep deposited particles further away from high-voltage counter-base electrode 8b. Moreover, increasing the ratio of inlet radius L1 to the base electrode 8a radius L4 is useful for reducing local electric field strengths. Sheath flow: This keeps particle laden air streams farther away from the high-voltage counter-base electrode 8b in the collection region. |
| High collection efficiency | Focusing particles to the center using a) tube electrode 8c and b) sheath flow |
| High collection mass flux | Defining the geometric length ratios: mainly, increasing the inlet tube radius L1 to collection plate radius L3 will increase the flow rate that one can achieve for keeping the same lower size-dependence, but the efficiency will go down. Note: Constraints exist on this ratio because of the constraints on the ratio of the inlet tube radius L1 to the separation distance L2. Sheath flow: depending on the axial velocity profile, this increases the operable flow rate limit for a similar size-dependence performance. Moreover, the increase in collection efficiency also directly effects the collection mass flux. |

Embodiments of the invention may advantageously be used in various applications, including:

- Aerosol sample collection for spectroscopy and spectrometry—or other types of chemical analyses—for studies in air quality, atmospheric science, or industries that involve particle generation (e.g., fabrication and manufacturing, construction, e-cigarettes) where worker or customer safety is a consideration.
- Seeding applications for subsequent epitaxial film growth of bulk/film crystals can prove useful in membrane technology and nanocrystal technology.
- Health studies where collection of biological sample is needed for subsequent optical analysis or other in-vitro/in-vivo studies.
- Coating applications.

An unexpected finding by the inventors of the present invention is that the particle velocity distribution at the plane of deposition (just before collection on the collector plate 20) is not a direct representation of the final distribution of deposited particles. This finding contradicts conventional thinking such as found in the work of Dixkens and Fissans [1] and Preger et al. [2], but is an important consideration predicting and therefore optimizing particle deposition patterns.

Figure 16:
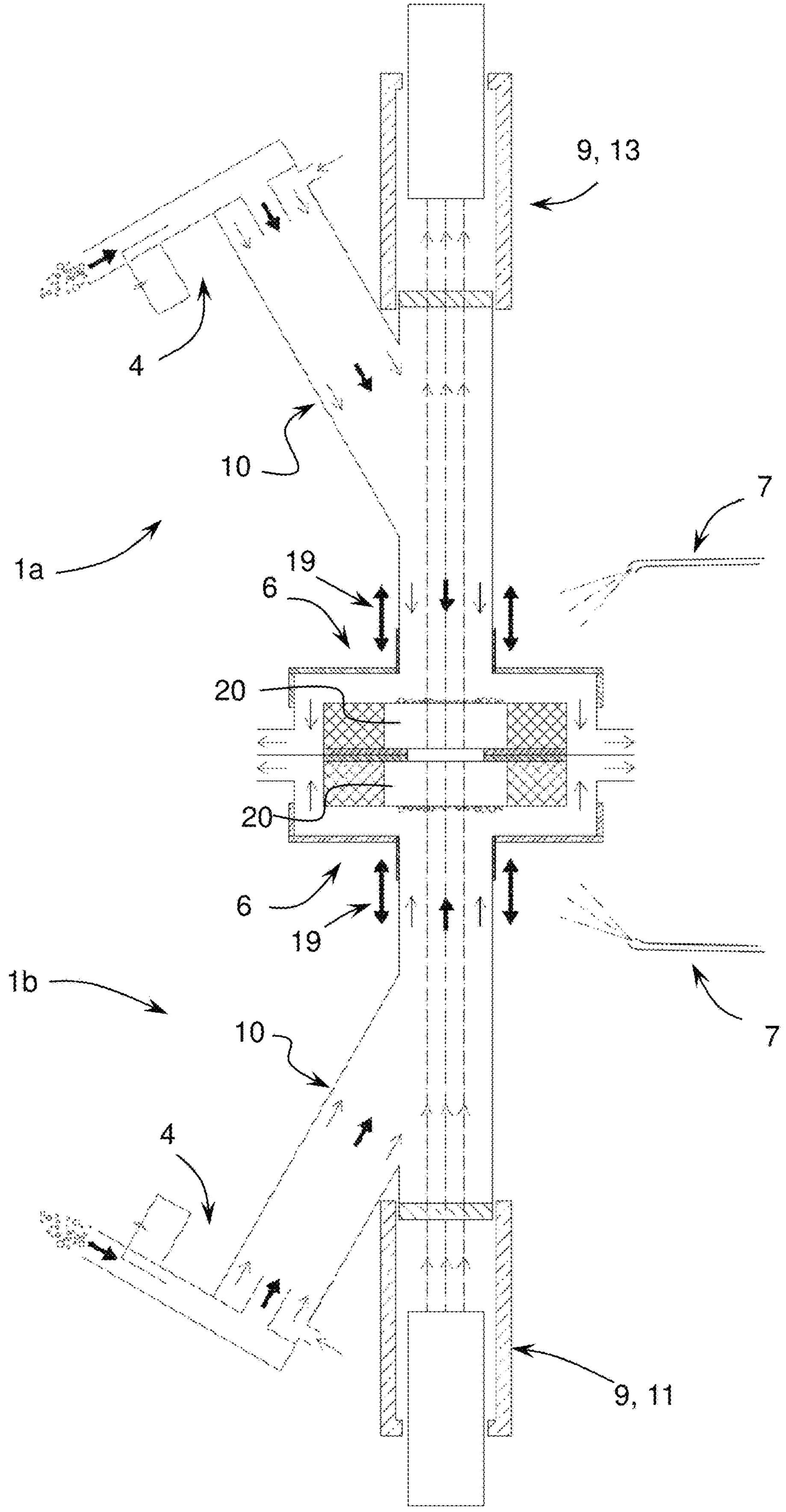
FIG. 16 is a cross-sectional schematic simplified view similar to FIG. 1 of a particle collector according to a variant of the invention with two particle collection sections.
Figure 17:
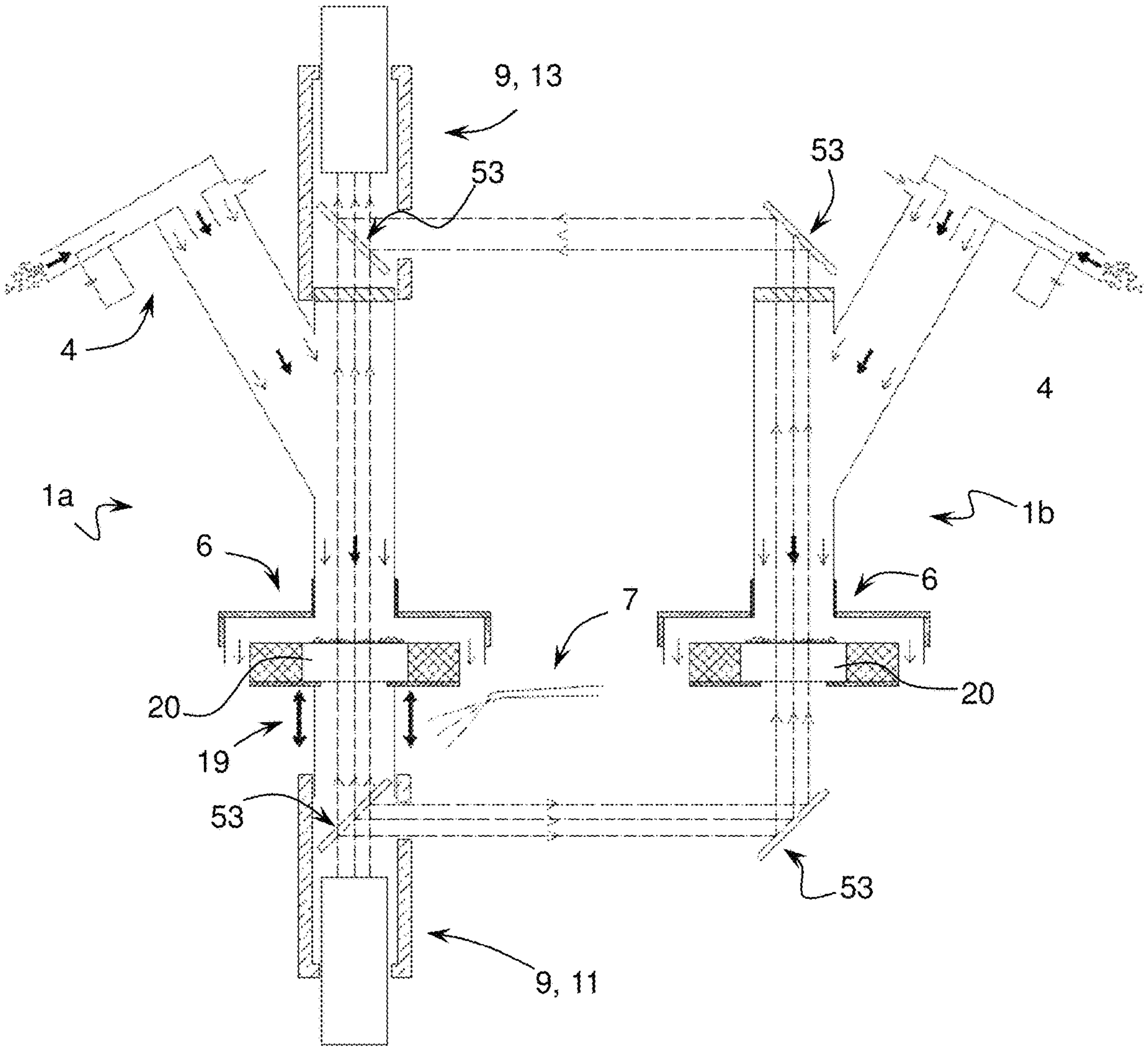
FIG. 17 is a cross-sectional schematic simplified view similar to FIGS. 1 and 16 of a particle collector according to a yet another variant of the invention.

As illustrated in FIGS. 16 and 17, the ESP particle collector 1 according to variants may have a pair of inlet and collector sections 4, 6 and associated flow tubes, coupled optically to a common measuring instrument 9.

In the embodiment of FIG. 16, the pair of inlet and collector sections are arranged in mirror image symmetry.

In the embodiment of FIG. 17 the pair of inlet and collector sections are arranged in parallel, with beam splitters and mirrors 53 positioned in the optical path between the light source 11 and light detector 13 so as to split the beam at the source 11 into two beams, one passing through each collector plate 20, and then collect the two beams at the detector 13.

The pair of devices 1*a*, 1*b*, coupled to a common measuring instrument 9 allows to double the number of particles measured and thus increase the sensitivity and/or reduce the measurement cycle time of the measurement. Alternatively, the pair of devices allows to collect gases for measurement from two different positions, for instance in order to provide an average measurement value of a certain volume of measurement or to reduce the impact on measurement results due to a localized pollution at the inlet of one of the devices.

EXAMPLES OF IMPLEMENTATION

Use Case: "Aerosol Sampling Device for Quantitative Spectroscopic Analysis"

It is important to characterize the composition of aerosol particles in air, which causes adverse health effects and millions of deaths each year. Aerosol, or particulate matter (PM), is difficult to characterize because of its wide range of particle sizes (few nanometers to several micrometers); constituents (various organic and inorganic compounds); concentration (one to hundreds of $\mu g/m^3$, for PM<2.5 μm); morphology; state (liquid or solid); and time-dependent modification.

An ideal collector would enable collecting an aerosol sample that is an identical copy of the aerosol in air at an instant of time. Such a collector, when used with an ideal characterization method, will allow an ideal quantitative measurement of the composition of the aerosol. However, most conventional particle collectors modify or preferentially sample certain size ranges, chemical composition, morphology or state. Furthermore, collected sample is characterized for the constituents and/or their composition using numerous spectrometric techniques, which can induce further modifications. For example, most spectroscopic techniques require collecting aerosol on a surface for a prolonged period to make a confident claim about its constituents' composition.

Infrared (IR) spectroscopy is a non-destructive method, which provides useful chemical information about the constituents. Current methods for collecting samples use filters that are made of material which interferes with the IR spectra and thus lowers detection capabilities. Hence, collection on an IR-transparent substrate (for example, chalcogenide crystals) is desirable. A particle collector according to embodiments of the invention that achieves the advantages mentioned above allows to make a good quantitative measurement using IR-spectroscopy. Specifically, "Low size-dependence", "Low chemical interference" and "High collection efficiency" is required to collect an aerosol sample that is identical to the aerosol in air, "High spatial uniformity in deposition pattern" is required to reduce optical artefacts or spectrometer dependence, and "High collection mass flux" is required to reduce the collection time needed for making a confident claim.

Electrostatic precipitation (ESP) is a versatile method of collection and does not suffer from high pressure drop (which can modify the aerosol chemical composition, for example in filtration), or from bounce-off effects (which preferentially samples the size range and liquids, for example in impaction). ESP is a common device for dust removal but is also used for particle deposition.

Figure 5A:
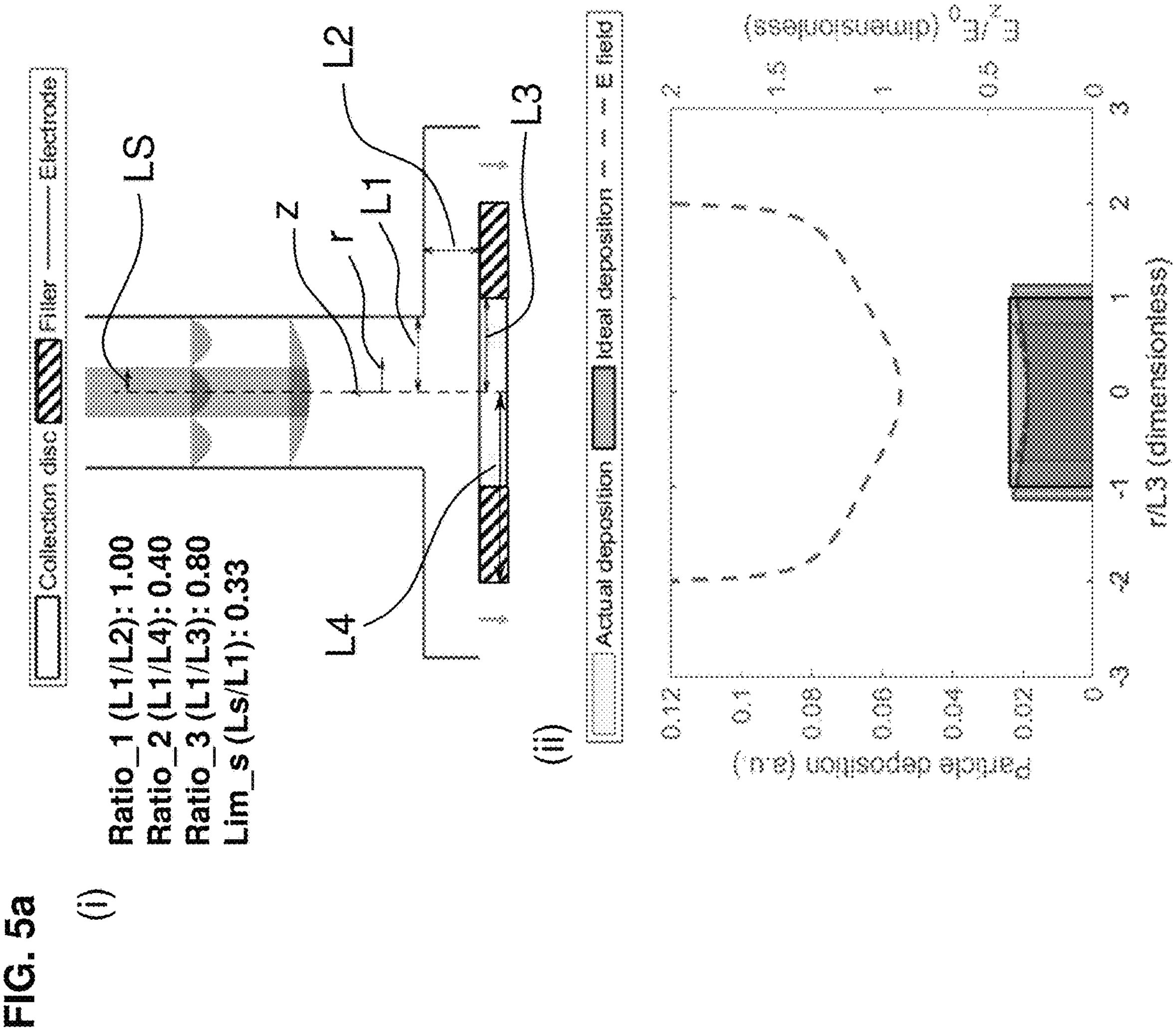
FIG. 5*a* illustrates: (a) schematically dimensions and gas axial velocity flow profiles of a particle collector according to an embodiment such as illustrated in FIG. 1; and (b) a simulated graphical distribution of particles and an electric field of the particle collector represented in (a)

Example 1: Referring to the exemplary embodiment illustrated schematically in FIG. 5*a*, the plot in 5*a*(*ii*), which is aligned along the vertical axis with the particle collector schematically shown in FIG. 5*a*(*i*), shows results from particle deposition simulations done using a simulation program (COMSOL Multiphysics). The difference between the outer radius of deposition of various sizes is low and the spatial deposition is close to the ideal profile. In this example the collector plate radius is L3=12.7 mm.

Figure 5B:
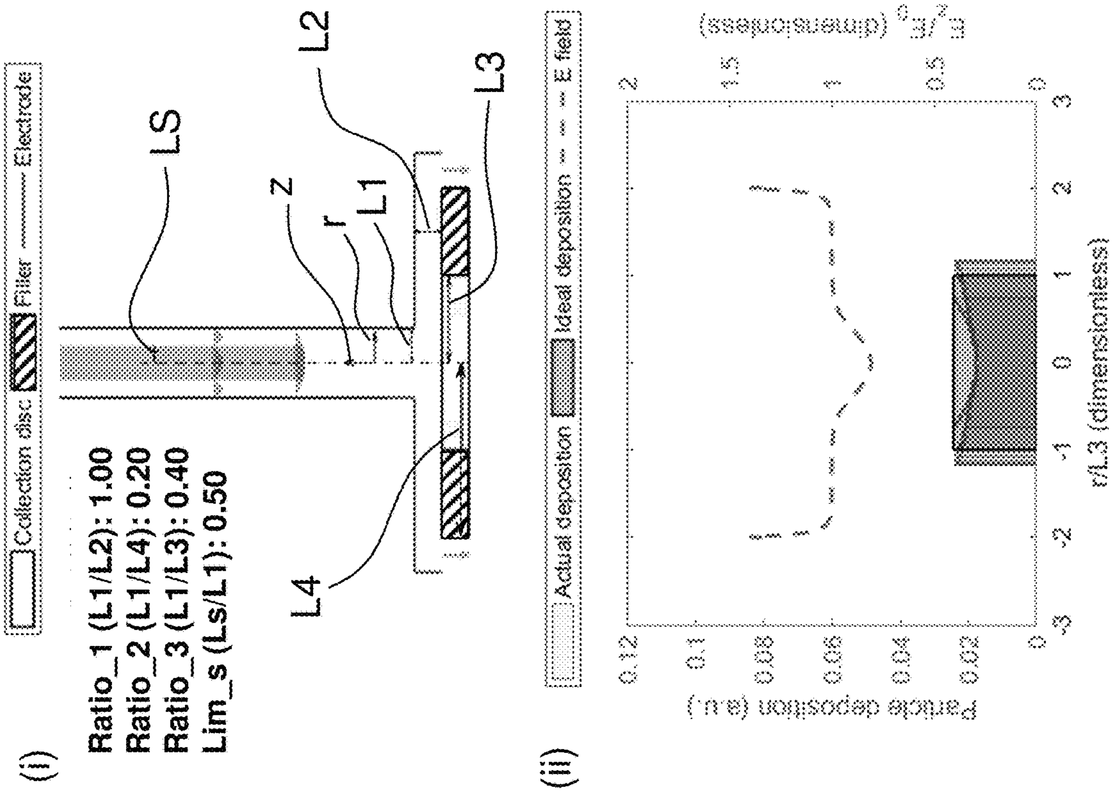
FIGS. 5*b* and 5*c* are similar to FIG. 5*a* however for different dimensions and ratios.
Figure 5C:
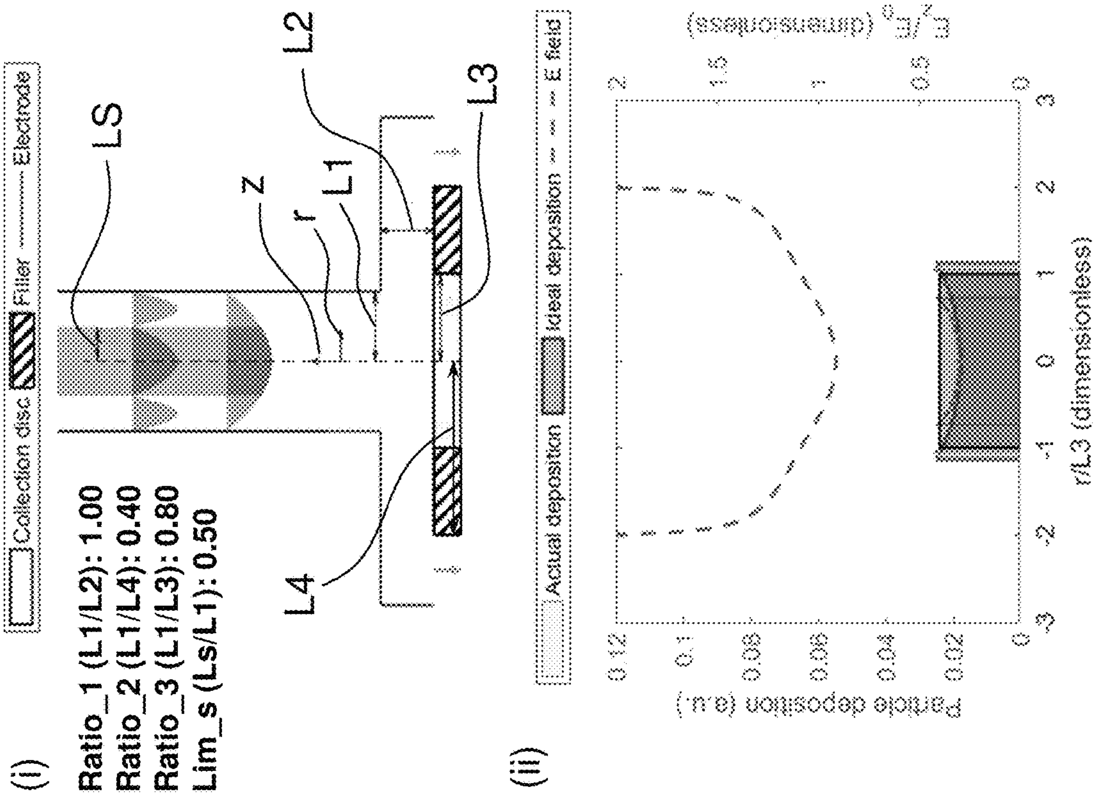

Inlet and Operating Conditions:

1. Inlet flow condition—Sheath flow: Sheath flow is used starting from a radial position that is $\lim_s$=⅓, i.e the radial position of commencement of sheath, Ls is ⅓d that of the inlet tube radius (L1) at the collector end. However, if needed, the sheath limit can be varied while it is lower than 0.5. This is important for the spatial uniformity of the final deposition.
2. Inlet charge condition—Particles are pre-charged before entering the collector section. The charging is selected to be at a level such that different sized particles are charged to a level corresponding to about 1 elementary charge for every 20 nm particle diameter.
3. Operating condition—electric field strength and voltage: The voltage was fixed at 10 kV on the counter-base electrode, while the base electrode is grounded. This leads to an electric field strength of 1 kV/mm. However, if needed, the voltage on the counter-base electrode can be varied while the electric field is lower than the breakdown strength in air (around 3 kV/mm), and while the absolute voltage on any electrode is lower than 10 kV, preferably.
4. Operating condition—flow rate: For the given collector disc size (L3=12.7 mm), given electric field strength of 1 kV/mm and the given charge condition of 1 elementary charge every 20 nm particle diameter, the flow rate is tuned such that the maximum deposition flux is obtained. This happens around 2 LPM (liters per minute) of aerosol (particle) flow. With the given sheath flow limit, $\lim_s$=⅓, this aerosol flow rate corresponds with a sheath flow rate of 7.5 LPM. If the sheath flow limit is changed to $\lim_s$=0.5 as shown in FIG. 5*c*, then the only change for operating condition would be to change the sheath flow to 4.6 LPM. If there is any change in the electric field strength, the degree of charge and the area of collection, the aerosol flow rate can be changed in direct proportion to either of those changes, in order to keep operating at the maximum deposition flux limit.

field strength was also halved, thus, 5 kV was applied on the counter-base electrode, while the base electrode is grounded.

4. Operating condition—flow rate: Same aerosol flow as Example 1, as the electric field strength, charge condition and the collector plate radius L3 is the same. Thus, 2 LPM of aerosol flow. However, With the given sheath flow limit, $\lim_s$=½, this aerosol flow rate corresponds with a sheath flow rate of 4.6 LPM. If the device in Example 1 is operated with a sheath limit of $\lim_s$=½ as well, then the sheath flow would have been kept the same at 4.6 LPM.

Equations of Radial ESP Systems Affecting Operating Conditions

Figure 6:
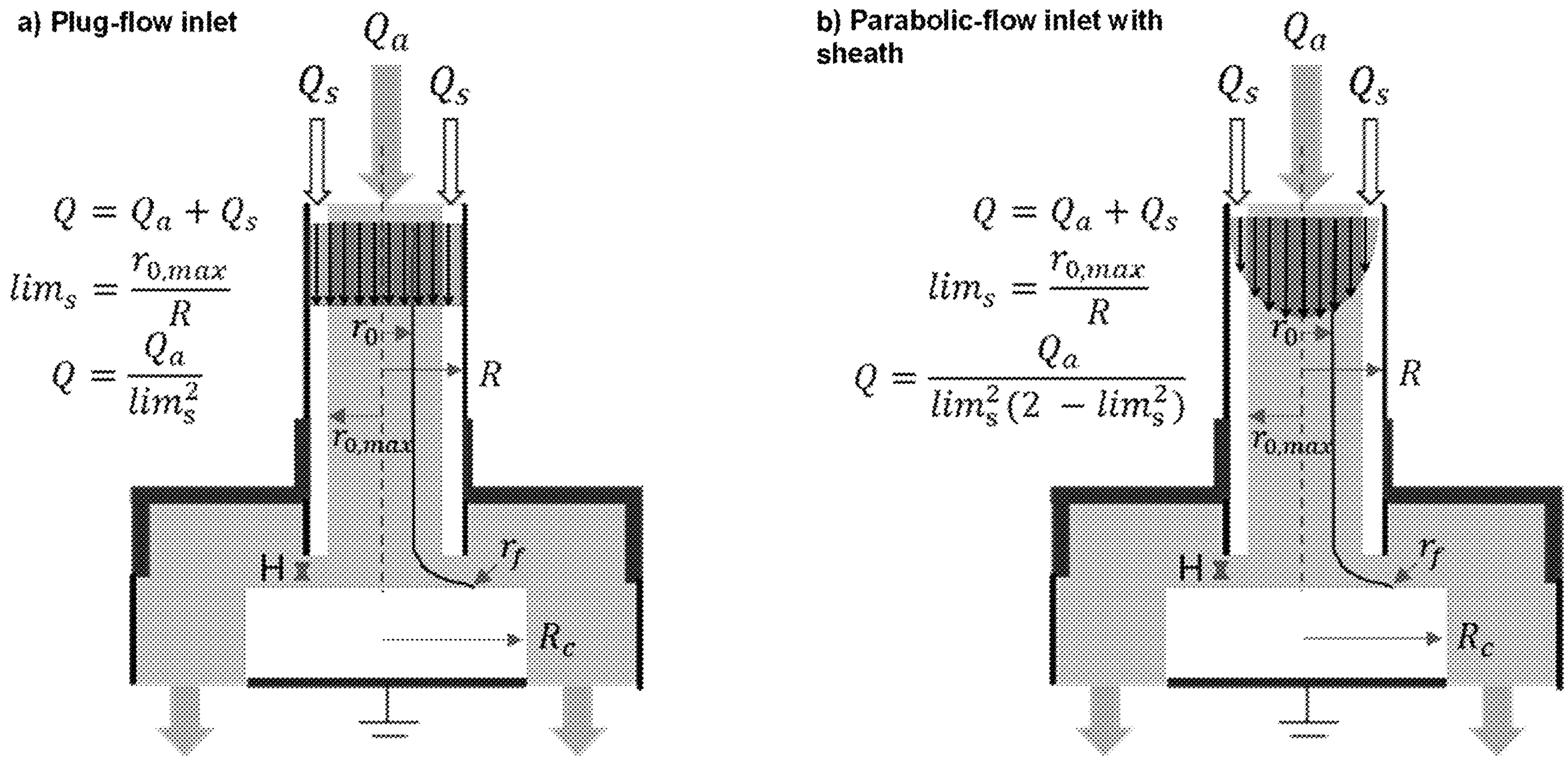
FIG. 6 is a schematic representation of inlet flow profiles.

Referring to FIG. 6, the basic equation for the radial ESP system is $$\frac{r_f}{R_c} = \frac{r_0}{R}\left(\frac{R}{R_c}\right)\sqrt{1 + \frac{v_{in}}{v_{elec}}\left(\frac{r_0}{R}\right)^{-1}\bar{f}_v(r_0)}$$

$$\Rightarrow \frac{r_f}{R_c} = \sqrt{\left(\frac{r_0}{R}\frac{R}{R_c}\right)^2 + 3\left(\frac{Q\mu}{eE_0R_c}\right)\left(\frac{D_p}{nC_cR_c}\right)\left(\frac{r_0}{R}\right)\bar{f}_v(r_0)}$$

where, Q=Total flow rate (aerosol flow rate+sheath flow rate), $E_0$=Electrostatic field strength, $D_p$=Particle diameter, $C_c$=Drag correction factor, $R_c$=Collection plate radius (L3), R=Inlet tube radius (L2), e=charge on an electron, n=no. of elemetray charges on the particle of size $D_p$, and μ=dynamic viscosity of air.

The equation is different for the two representative theoretical inlet flow profiles illustrated in FIG. 6: a) plug-flow and b) parabolic flow, based on the different expression of $\bar{f}_v(r_0)$ and Q for both the cases. For the limiting case of $$\frac{r_0}{R} = \frac{r_{0,max}}{R} = \lim_s$$

the final position for the outermost particle for both the equations become:

$$\frac{r_{f,max}}{R_c} = \sqrt{\left(\left(\frac{r_{0,max}}{R}\frac{R}{R_c}\right)^2 + 3\left(\frac{Q_a\mu}{eE_0R_c}\right)\left(\frac{D_p}{nC_cR_c}\right)\left(\frac{(r_{0,max}/R)^2\left[2-(r_{0,\max}/R)^2\right]}{(\lim_s)^2\left[2-(\lim_s)^2\right]}\right)\right)}$$

Parabolic−flow inlet $$\frac{r_{f,max}}{R_c} = \sqrt{\left(\left(\frac{r_{0,max}}{R}\frac{R}{R_c}\right)^2 + 3\left(\frac{Q_a\mu}{eE_0R_c}\right)\left(\frac{D_p}{nC_cR_c}\right)\left(\frac{(r_{0,\max}/R)^2}{\lim_s^2}\right)\right)}$$

Uniform−flow inlet

Example 2: This example shown in FIG. 5*b*, has the same collection plate radius and differs from Example 1 above mainly in the $\text{ratio}_3$ value L1/L3.

Inlet and Operating Conditions:

1. Inlet flow condition—Sheath flow: Sheath flow limit is $\lim_s$=½, instead of the ⅓ in the previous example 1.
2. Inlet charge condition—Same as Example 1, at 1 elementary charge for every 20 nm particle diameter.
3. Operating condition—electric field strength and voltage: The electric field strength was the same as that in Example 1, at 1 kV/mm. As $\text{ratio}_3$ is halved, the operating voltage in order to keep the same electric where, Qa=Aerosol flow rate (particle containing air stream)

Furthermore, this equation is in terms of the aerosol flow rate, which is the flow rate of interest as it contains the particle and if possible maximizing this flow rate while keeping the collection efficiency high would be ideal. Some key implications of the analytical model:

1. Results and analysis are scalable—as the model is dimensionless: The analytical model generalizes device performance in one geometry to a wide range of others due to its dimensionless form. For a given inlet flow condition (parabolic or uniform) and a fixed sheath position ($lim_s$), there are mainly 4 dimensionless parameters:

$$\left(\frac{r_{0,max}}{R}\frac{R}{R_c}\right)$$

—relating to geometry, $$\left(\frac{Q_a\mu}{eE_0R_c}\right)$$

—relating to operating parameters, $$\left(\frac{D_p}{nC_cR_c}\right)$$

—relating to particle properties and $$\left(\frac{r_{f,max}}{R_c}\right)$$

—relating to particle collection performance. All these four parameters scale with the collection plate radius (L3=$R_c$).

2. For operation conditions, $Q_a/E$ is present in a term, meaning that doubling the electric field strength and the aerosol flow rate would result in the exact same aerosol collection performance.
3. For particle based dependence, D/n is present in a term, meaning that if the amount of charge on a particle scales proportional to its diameter (which is many times the case), then there is negligible effect on particle size performance because of charge alone. However, the size dependence emerges because the drift correction, $C_c$ ranges over orders of magnitude for particle sizes between 100 nm and 1 μm. This is the mathematical representation of the size-dependence in the ESP device.
4. Collection performance is related to the outermost final portion of the particle on the collector plate, $$\left(\frac{r_{f,max}}{R_c}\right),$$

as larger this value, the more spread out the collection and thus lower the collection efficiency. If the final spatial deposition is uniform, then the collection efficiency can be represented as $$\eta = \frac{\pi R_c^2}{\pi r_{f,max}^2} = \left(\frac{r_{f,max}}{R_c}\right)^{-2}.$$

5. Most importantly, this analytical model is original in that it includes this vast number of geometric, operating and performance parameters, allowing using it to propose geometries for a desired performance and operating condition, or to find operating conditions for a given geometry and desired performance or to simply evaluate the performance of a given device operating at certain conditions.

Factors Important for "High Spatial Uniformity in Deposition Pattern".

1. Inlet condition—Sheath flow and axial velocity profile: The axial velocity profile under laminar flow conditions (mostly the case in this invention), can either be parabolic-like (when near fully developed for example), or plug-flow-like (when entering a sudden contraction, or exiting a nozzle for example). Both conditions are possible and result in different spatial deposition pattern—and ultimately the spatial uniformity. For the case of plug-flow-like inlet some sheath might be required depending on how the plug-flow is developed (orifice, nozzle, flow straightener, others).

Figure 7B:
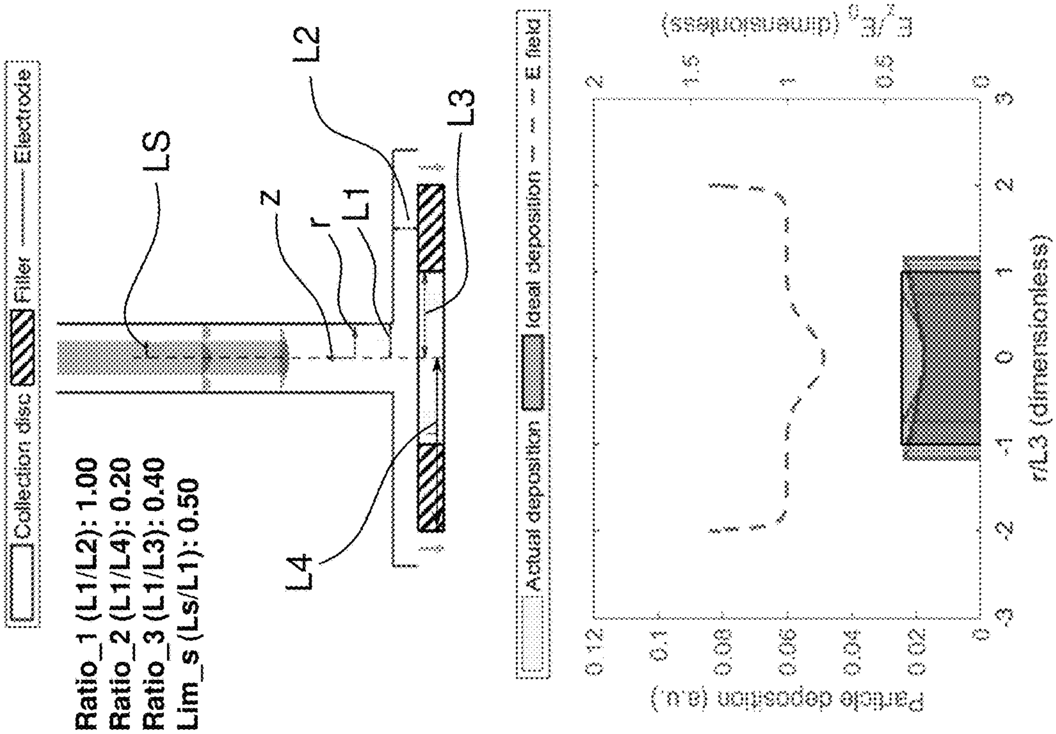
FIGS. 7*a*, 7*b* are similar to FIG. 5*a* illustrating the effect of the sheath position on the collection performance and spatial uniformity of deposition, FIG. 7*a* illustrating the case for no sheath and FIG. 7*b* with a sheath having in radius of 50% of the channel radius.
Figure 7A:
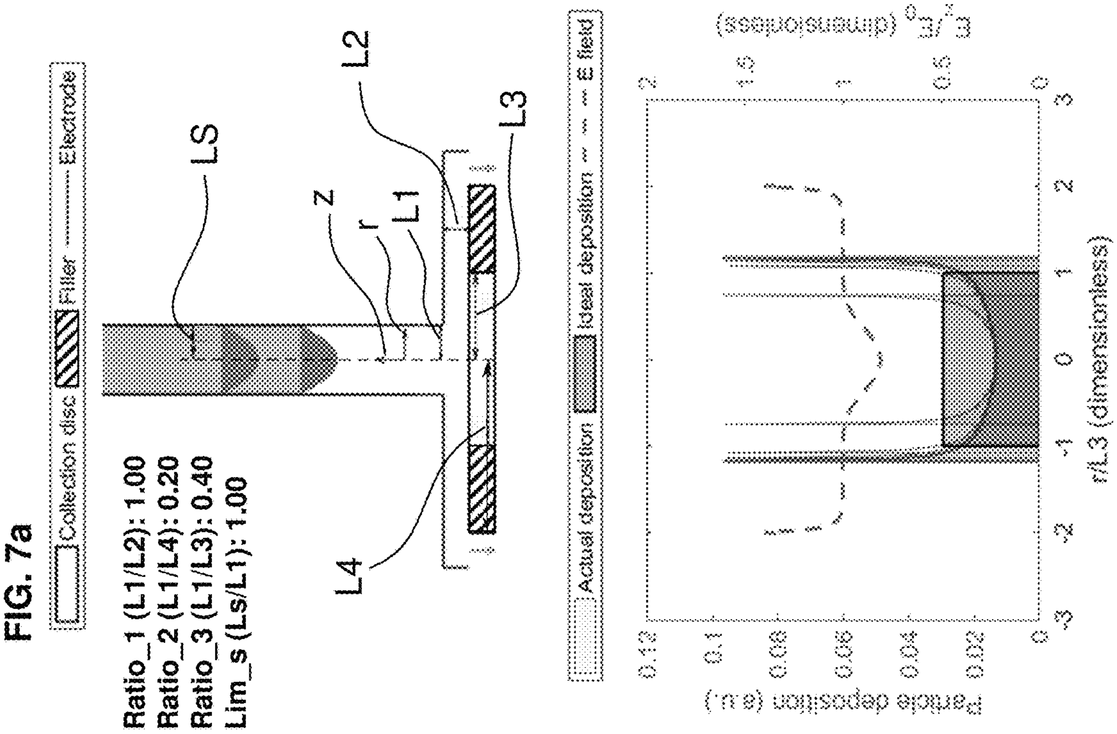
Figure 8A:
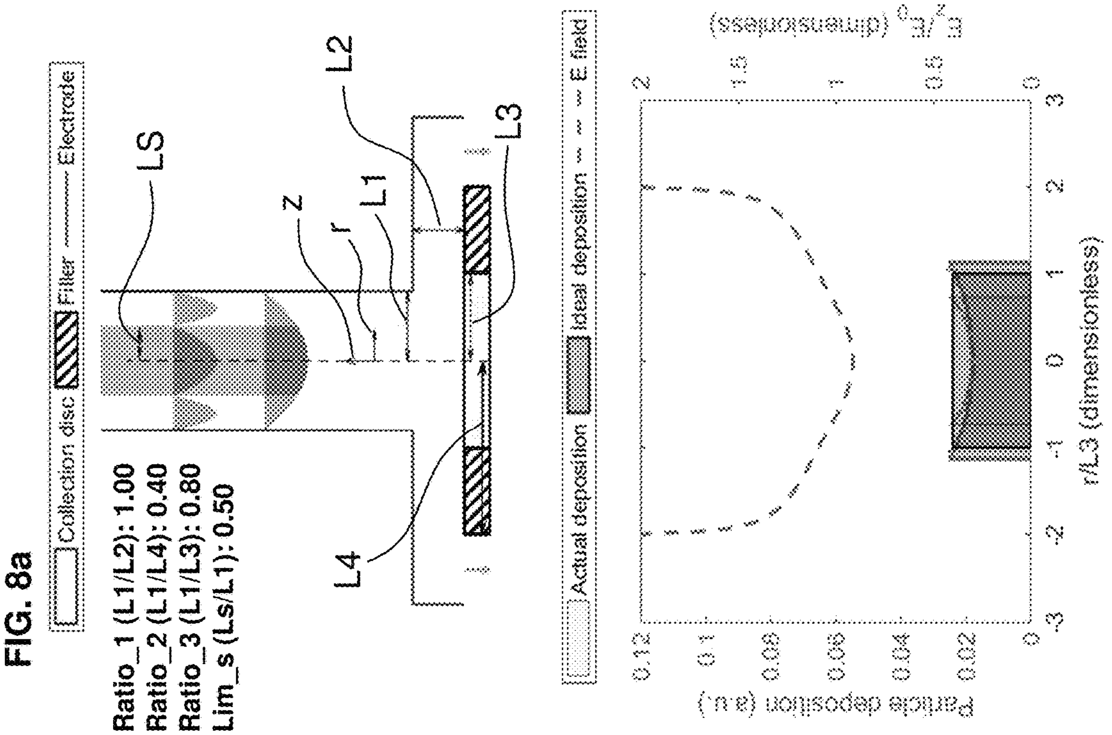
FIGS. 8*a*, 8*b* are similar to FIGS. 7*a*, 7*b* illustrating the effect of changing the ratio of the inlet parameter versus the separation distance between the counter-base electrode and the collector plate.
Figure 8B:
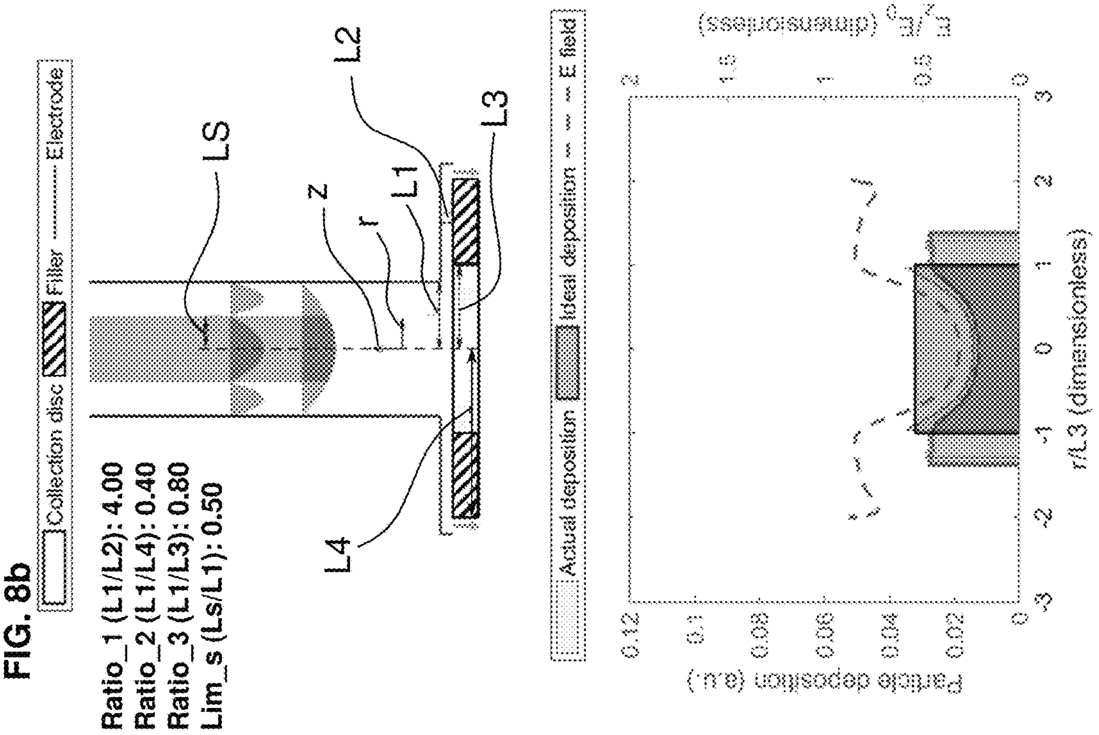
Figure 9A:
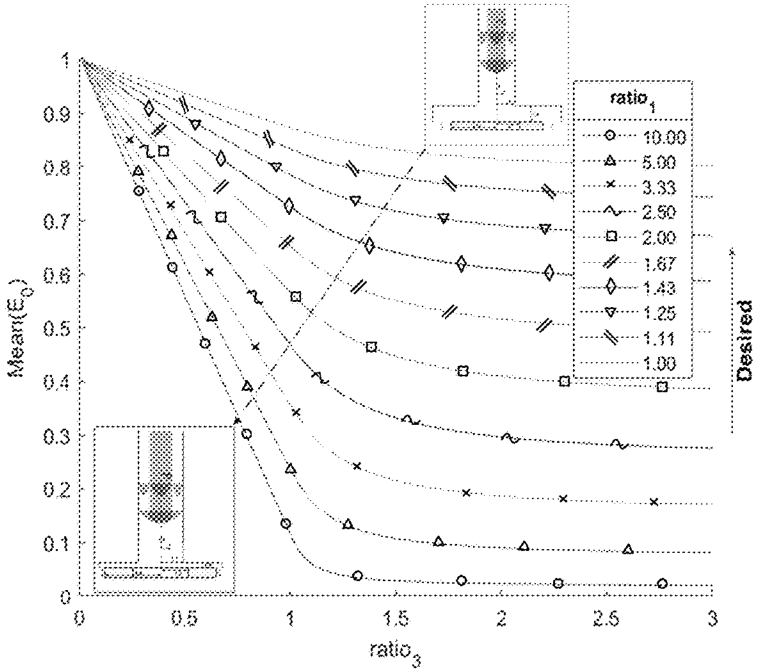
FIGS. 9*a*, 9*b* illustrate plots of the electrical field strength over the collector plate, in particular FIG. 9*a* illustrating an average electric field strength (normalized by maximum) over the collector plate and FIG. 9*b* illustrating a variation of the electric field strength (normalized by maximum) over the collector plate both for different ratio_1 and ratio_3 values, ratio_1 defined by the radius of the inlet of the collection section over a separation distance between the collector plate and counter-base electrode, and ratio_3 being defined by the radius of the inlet of the collection section over a radius of the collector plate.

For parabolic-flow-like inlet makes the deposition uniform—the closer to the center the sheath flow starts, the greater is the effect of making the final deposition uniform. A radial starting position of 0.5 (as a ratio to the inlet tube radius, $L_1$) is desirable for parabolic flow. This helps achieve spatial uniformity, even for a parabolic like axis velocity at the inlet. An example of using no sheath vs using a sheath flow for parabolic-flow-like inlet, is shown in FIGS. 7, 7*b*.
2. Device geometry—Ratio of the inlet tube radius L1 to the separation distance L2 ($ratio_1$): As this ratio changes, the radial distribution of the electric field strength over the collector plate changes. This change in electric field strength just under the inlet tube is evident in all the simulations (COMSOL Multiphysics simulations). An example of the effect of $ratio_1$ (for values equal to 1.00 and 4.00) is shown in FIGS. 8*a*, 8*b*. A very high value results in non-uniformity in deposition because of the non uniformity in the electric field strength. The average and the variation of the electric field strength (normalized to maximum) over the collector plate is shown in FIG. 9*a*, as a function of both $ratio_1$ and $ratio_3$. $ratio_1<1.5$ results in low variations. Moreover, there is a clear advantage of using lower values of $ratio_1$ as the average electric field strength over the collector plate is high over a wide range of $ratio_3$.

Factors Important for "Low Size-Dependence".

1. Device geometry—Ratio of the inlet tube radius to the collector plate radius ($ratio_3$): Some points that affect $ratio_3$ are discussed here.

Figure 12:
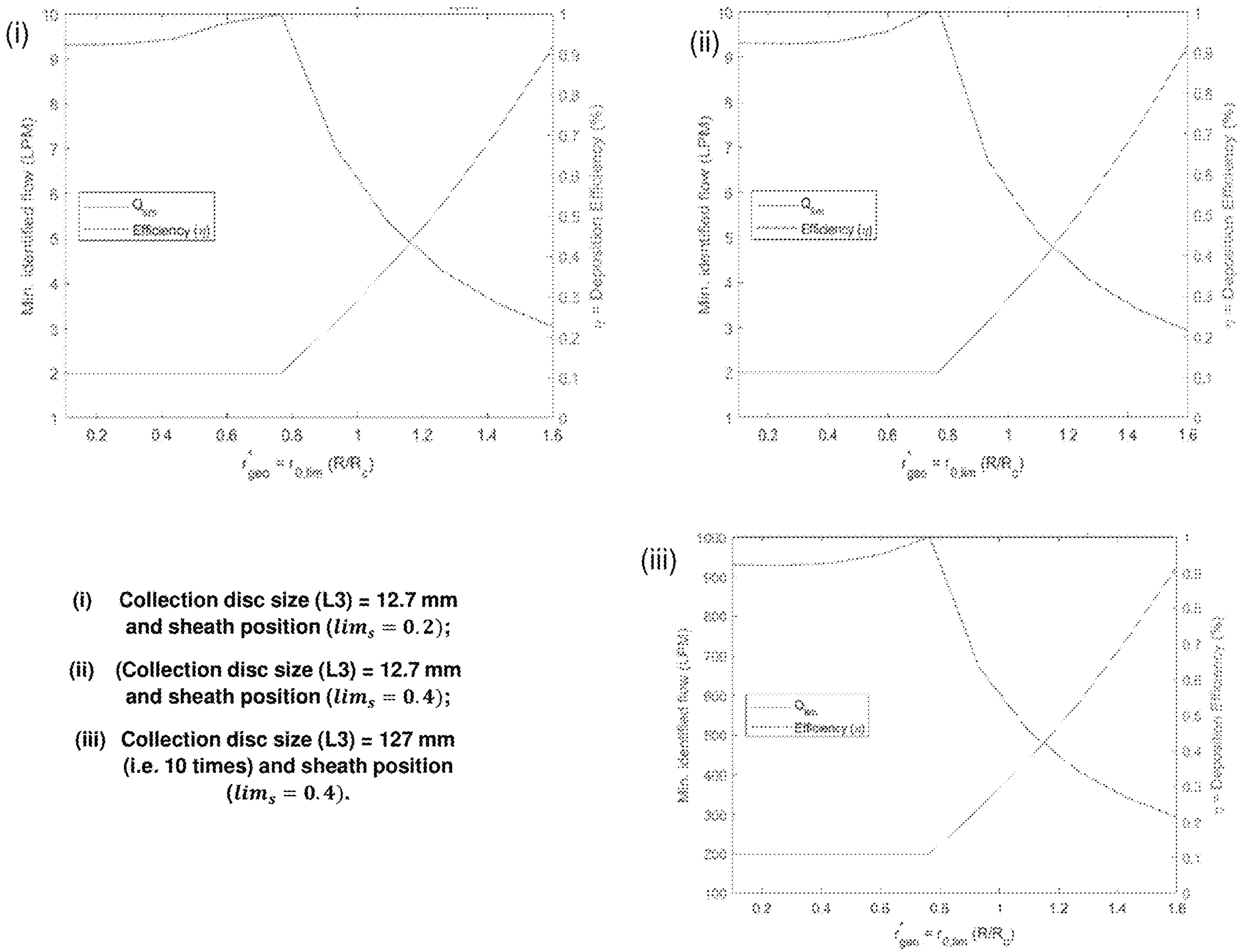
FIG. 12 illustrates an example of a collection efficiency (dotted line) at the analyzed operation flow rate such that we are close to increase collection volume flux (product of particle flow rate and the efficiency) for different collector plate and sheath conditions: (i) Collector plate radius (L3)= 12.7 mm and sheath position ($lim_s$=0.2). (ii) Collector plate radius (L3)=12.7 mm and sheath position ($lim_s$=0.4). (iii) Collector plate radius (L3)=127 mm (i.e. 10 times) and sheath position ($lim_s$=0.4).

Firstly, FIG. 12, shows that the values of $(lim_s)\times ratio_3>1.1$ reduces the efficiency to below 50%, which is not desirable. Hence, desirable values are $$ratio_3 < \frac{1.1}{lim_s}.$$

For example, if radial sheath position (position where sheath begins as a ratio of the inlet radius, $L_1$) is 0.5, then $ratio_3<2.2$. This consideration of efficiency is high in priority, though it can be overruled if low efficiency is justified for the process.

Secondly, very low values of the inlet radius L1, can result in impaction of particles, which is not desired. With a smaller radius inlet tube there are higher chances of irregularities affecting the deposition. Furthermore, as $ratio_1$ would be fixed, making the inlet radius small, would also bring the electrodes closer the collector plate, which increases the likelihood of electrical discharge. For these reasons, operating at low inlet radius sizes is not desirable. As these considerations are quite subjective, the actual scale of the collector plate is needed to make better estimate on this value. Tentatively, if we are on the scale of 10s of mm for the collector plate, then a ratio of $ratio_3 > 0.1$ is desirable, with a higher value being better. The consideration of the effect of impaction and electrical discharge possibility is of high priority.

Figure 9B:
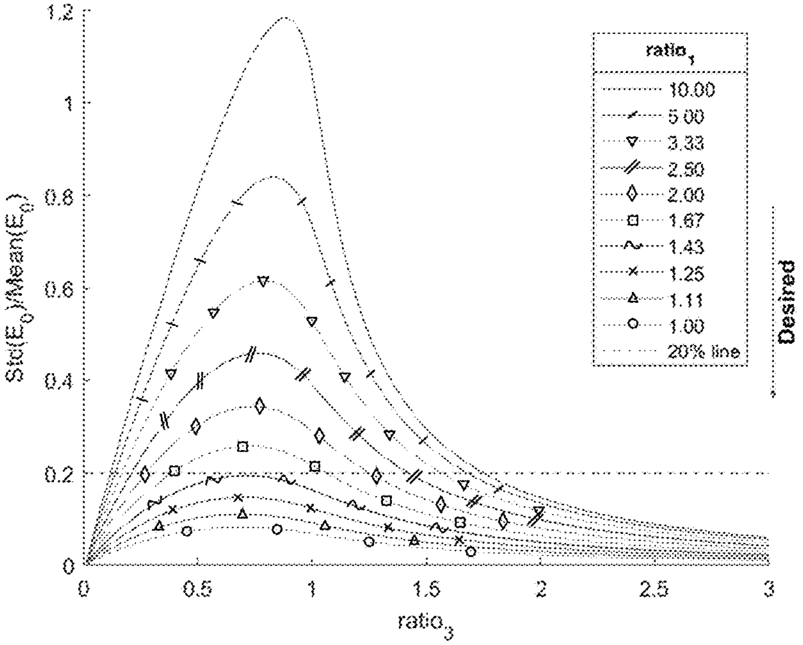
Figure 10:
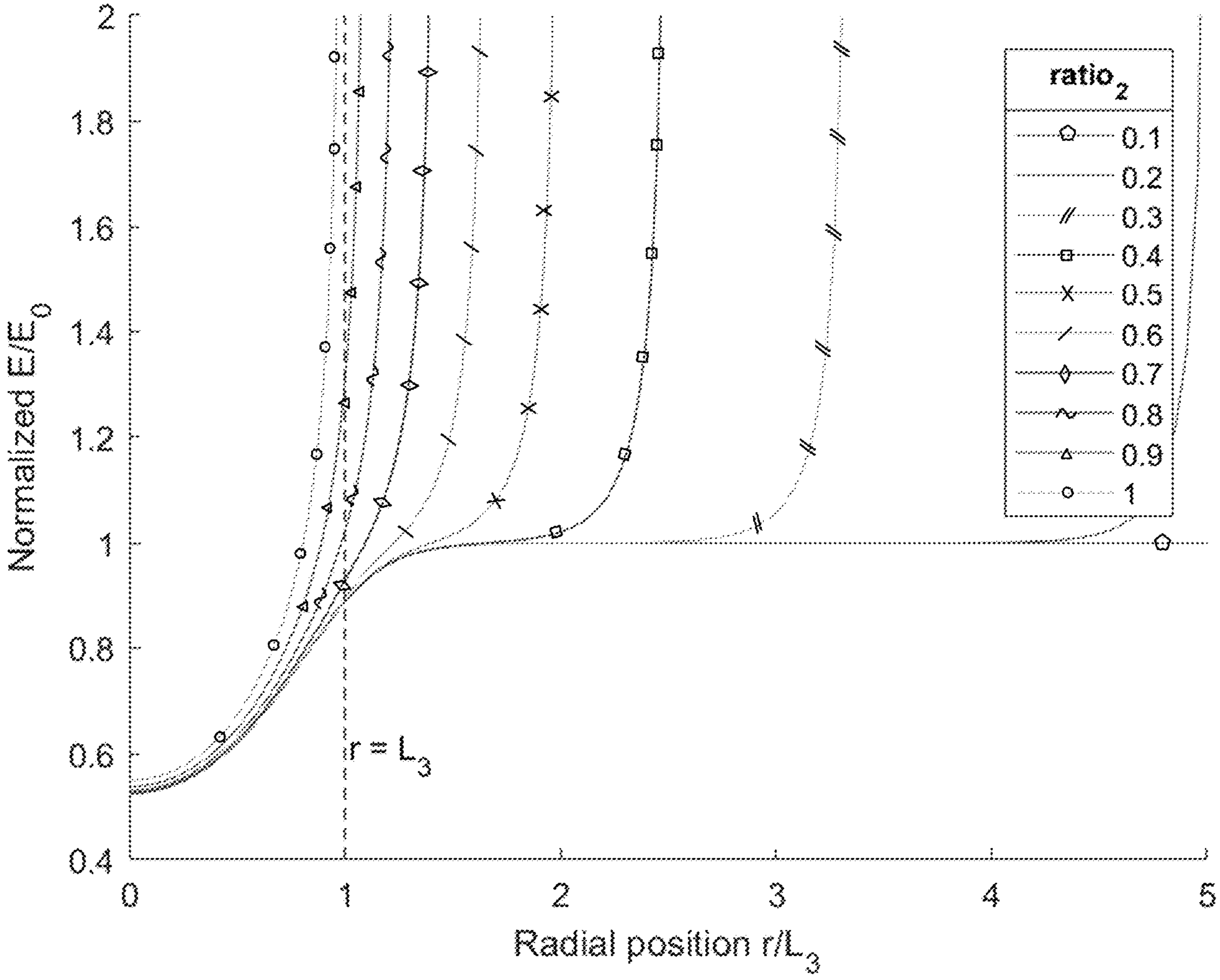
FIG. 10 illustrates a plot of the effect of ratio_2 defined by a ratio between the inlet tube radius at the collector end over a radius of the collector plate including the collector disc and filler, whereby in the FIG. 10 the ratio_1 has a value of two.

Lastly, FIG. 9*b*, apart from showing the effect of $ratio_1$ also shows range of $ratio_3$ values that can adversely affect the electric field strength above the collector plate (and hence, the uniformity). Very low ratios $ratio_3 < 0.1$ have a low variation and a high average value of the electric field strength. Similarly, higher values, $ratio_3 > 2$ also reduces the variations because of $ratio_1$ (though the average electric field strength is not as high at these values). This consideration, though important, can also be solved by choosing the correct, $ratio_1$ values, and is hence of lower priority.

Figure 14:
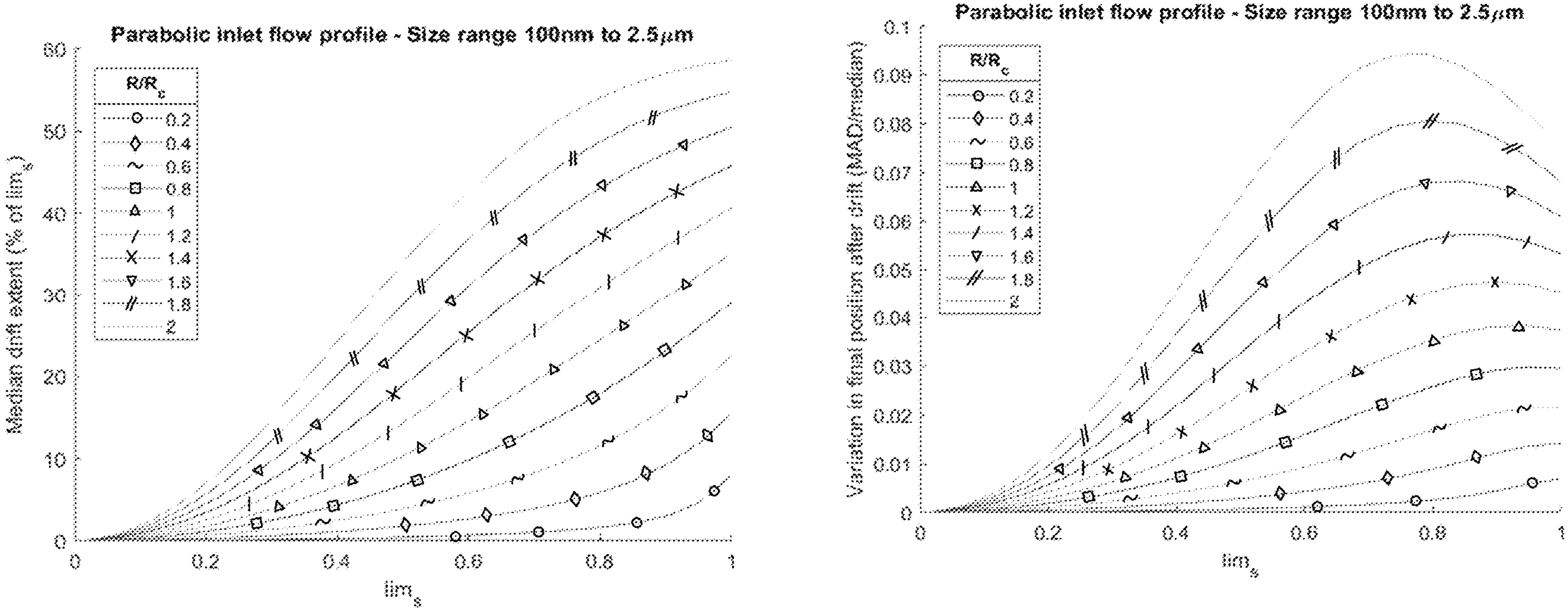
FIG. 14 illustrates plots of an example of an extent of the particle focusing (drift) towards the center line because of tube electrode based on different $ratio_3$ and $lim_s$ values (i) Extent of drift (expressed as percentage) (ii) Size-based variation (expressed as normalized median absolute deviation) in the final position after drift only i.e. does not include particle collection change.

2. Inlet condition—Sheath flow: Particles are focused towards the center because of the tube electrode. Details of the extent of focusing is shown and discussed in FIG. 14. The effect is different for different particle sizes and smaller particles are focused more and hence, induces size-dependence. The closer to the center the sheath flow starts, i.e. lower the value of $lim_s$, the extent of size dependence is lower (for both uniform flow and parabolic flow inlet). Thus, lower values of $lim_s$ is desirable.

Factors Important for "Low Chemical Interference".

1. Operating condition—Electric field strength ($E_0$): Very high electric field strengths are undesired as chemical interference can increase through generation of reactive free radicals that react with the particles. The electrical breakdown of air is around 3 kV/mm. An average electric field strength is the ratio of the applied voltage (between counter-base electrode and the base electrode), and the separation distance L2. However, the presence of edges and of charged particle inside this electric field can enhance the local electric field strength values. Hence, a factor of safety (of 1.5 or 2 for example) should be used to limit the design electric field strength. Furthermore, some studies on streamer discharge also mention onset conditions from electric field strength of 2.28 kV/mm [4].

In the two embodiment examples 1 and 2, a safety factor of 3 is used on the breakdown voltage in which manner it is also below the 2.28 kV/mm limit.

2. Operating condition—Counter-base electrode Voltage: Apart from an electrical discharge stemming from the local electric field strength, there are a few processes which also limit the voltage directly, to a degree. For example, Trichel discharge from electrodes (generally sharp) with high negative potential or streamer discharge from electrodes (generally sharp) with high positive potential have similar onset conditions [3]. Trichel discharge has been shown to have lesser dependence on the separation distance and onset from above 10 kV in magnitude. For these reasons, the examples 1 and 2 are to be operated at 10 kV and 5 kV respectively.

3. Inlet condition—Sheath flow: The closer to the center the sheath flow starts (i.e. lower the value of $lim_s$), the further away particles are kept from the high voltage on the tube electrode and the counter-base electrode. Some studies [6] have shown that any ozone produced between electrodes has a hyperbolic concentration profile which decreases further away from the discharge electrode. Thus, lower values of $lim_s$ is desirable.

4. Device geometry—Ratio of the inlet tube radius to the base electrode radius ($ratio_2$): The sudden increase in electric field strength values because of $ratio_2 > 0.5$, is undesirable also because it might result in possible chemical modification. Thus, values of $ratio_2 < 0.5$ is desirable.

Factors Important for "High Collection Efficiency" and "High Collection Mass Flux".

1. Inlet condition—Charge: It is assumed that the particles are charged prior to introducing into the device. Any charger that charges the particles using field charging/diffusion charging/UV charging can be used. The number of elementary charges on a particle charged using a combination of field charging and space charging is approximately directly proportional to the particle size. In the examples 1 and 2, it has been assumed that 1 elementary charge per 20 nm diameter is present. The charger used in Examples 1 and 2 is a wire-wire charger per se known as a part of a bioaerosol sampling device that has low ozone generation (hence, low chemical interference).

Figure 11:
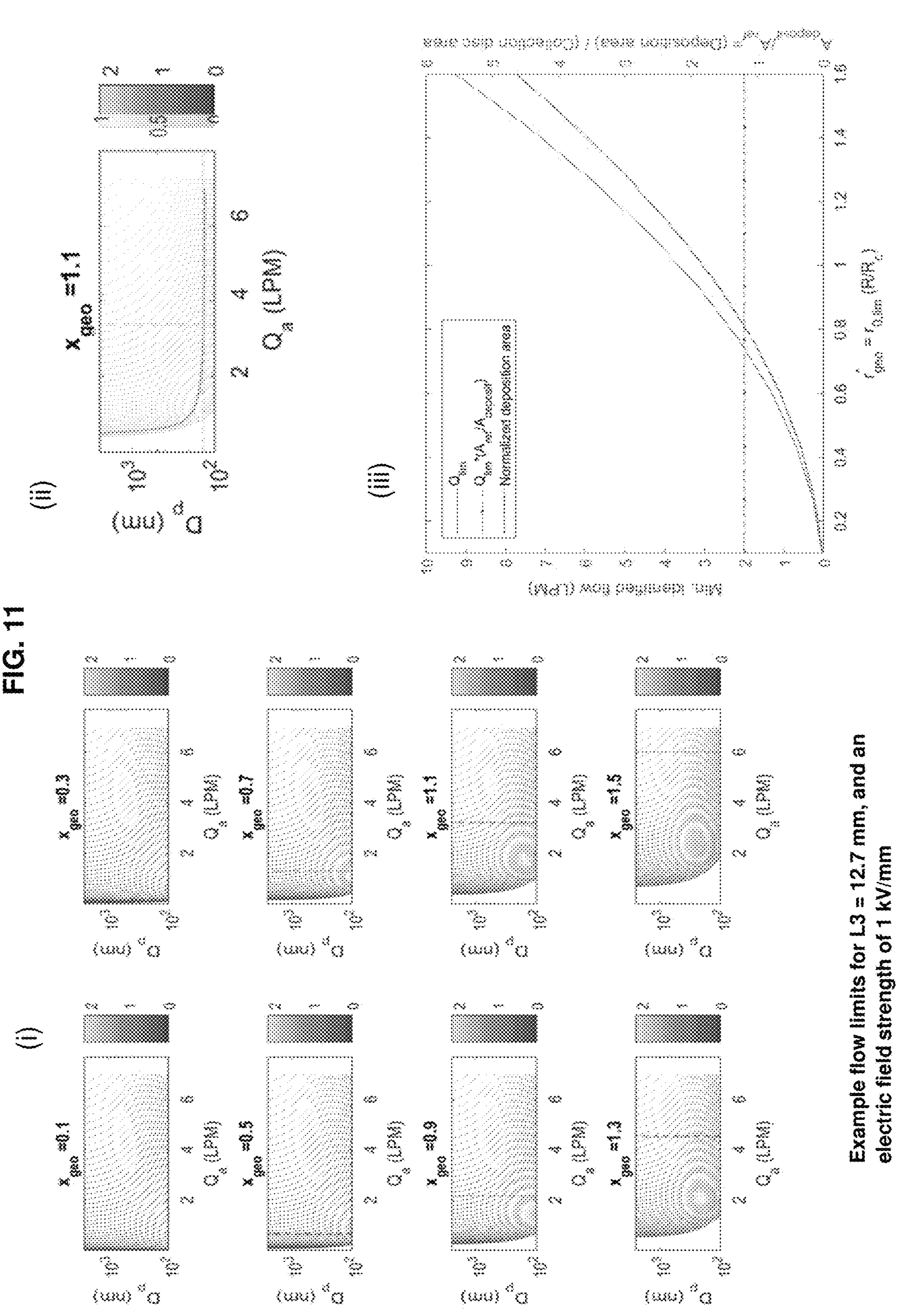
FIG. 11 illustrates an example of flow limits for a collector disc radius R3=12.7 mm, and an electric field strength of 1 kV/mm; (i) Each subplot (for different $x_{geo}$=$lim_s$x$ratio_3$) shows the final deposition position (color-bar) for different sizes (y-axis) and flow rates (x-axis). The vertical dotted line represents the minimum flow rate where the size-dependence is low. (ii) A diagram similar to that in part (i) with overlaid plot that shows the change in variation (red line) with the flow rate and point where this variation is low. (iii) Change in flow rate (left y-axis) as a function of $x_{geo}$=$lim_s$× $ratio_3$. The final deposition area can be smaller or larger than the collector plate radius and this normalized collection spot area is shown on the right y-axis. By dividing the flow rate with its spot area we get the flux representation (dotted horizontal line).

2. Operating condition—Flow Rate and collection flux: The relationship between the total operating flow rate and the particle-laden aerosol flow rate ($Q_a$) is shown in FIG. 6. An example of determining the operating aerosol flow rate for a design such that size-dependence is low and collection flux is high is shown FIG. 11. The variables affecting this flow rate is illustrated in FIG. 8. FIG. 11 shows the minimum aerosol flow rate limit for different designs on the same collector plate are and the same charging and electric field conditions. Note that the focusing effect because of tube electrode is present in these calculations. Surprisingly, the volume flux of deposition is nearly a constant i.e. by changing the geometry (sheath position and $ratio_3$) the proportion of change in the flow rate limit for a said size-dependence is the same as the proportion change in the collection spot area on the collector plate.

Hence, we can see that for a given charge condition, particle size range and electric field strength, the collection volume flux is more or less a constant at $\varphi_{max} = Q_a/(\pi R_c^2) = 0.3936$ LPM/cm$^2$. Moreover, on this value, there is absolutely no variation because of the collector plate radius (over orders of magnitude) and very small variation if the sheath position changed as shown in FIG. 13.

For the examples 1 and 2, as the collector plate radius is 12.7 mm, we operate the device at $0.3936 \times 3.14 \times 1.27^2 \approx 2$ LPM. The charging condition used was 1 elementary charge for every 20 nm diameter, and the particle size range was from 100 nm to 2.5 μm (though the difference for a range of 100 nm to 1 μm was very little).

The collection mass flux can be calculated by multiplying the collection volume flux with the particle concentration and the mass density of each particle.

3. Device geometry—Tube electrode: The presence of tube electrode results in particles being focused towards the center. This effect is very prominent and results in increase in collection efficiency (as the particles are closer to the center). The extent of focusing is different for different flow rate, electric field strength and particle size. If the device is operated at the flow rate limit (as discussed above), then for a given collector plate radius, the drift effect is shown for different geometric parameters. For a parabolic flow inlet profile, FIG. 14 (i) and (ii) shows the extent of drift (as percentage drift away from the initial position in the tube, sheath position $lim_s$), and the size-based variation in the extent of drift (shown as the ratio if median absolute deviation (MAD) and the median). The size-based dependence is not desirable.

5. Inlet condition—Sheath flow: For a given $ratio_3$ value, the sheath position can be lowered in order to operate at a higher efficiency. As shown in FIG. 12, values of $ratio_3 \times lim_s > 0.8$ (approximately), the maximum collection efficiency decreases as the minimum operating flow rate for "acceptable" size-dependent variation is high. Thus, for a given $ratio_3$ value, $lim_s$ can be lowered till $ratio_3 \times lim_s < 0.8$, if possible. Furthermore, lower $lim_s$ would result in lower size-dependent variation because of the tube electrode focusing. Thus, lower values of $lim_s$ is desirable.

4. Device geometry—Ratio of the inlet tube radius to the separation distance ($ratio_1$): As shown in FIGS. 8*a*, 8*b*, a higher value of $ratio_1$ results in a more non-uniform electric field strength, which not only changes the spatial uniformity but also the collection efficiency (as FIG. 11*b* has the final particle deposition more spread out than in FIG. 11*a*). This is because the high non-uniformity of the electric field strength is coupled with lower values (especially closer to the center), which results in less particle deposition in the region under the tube.

Other Factors that are Important in the Particle Collector Device Design.

Upper Limit on the Collector Plate Radius (L3) to Keep the Flow Laminar

Figure 15:
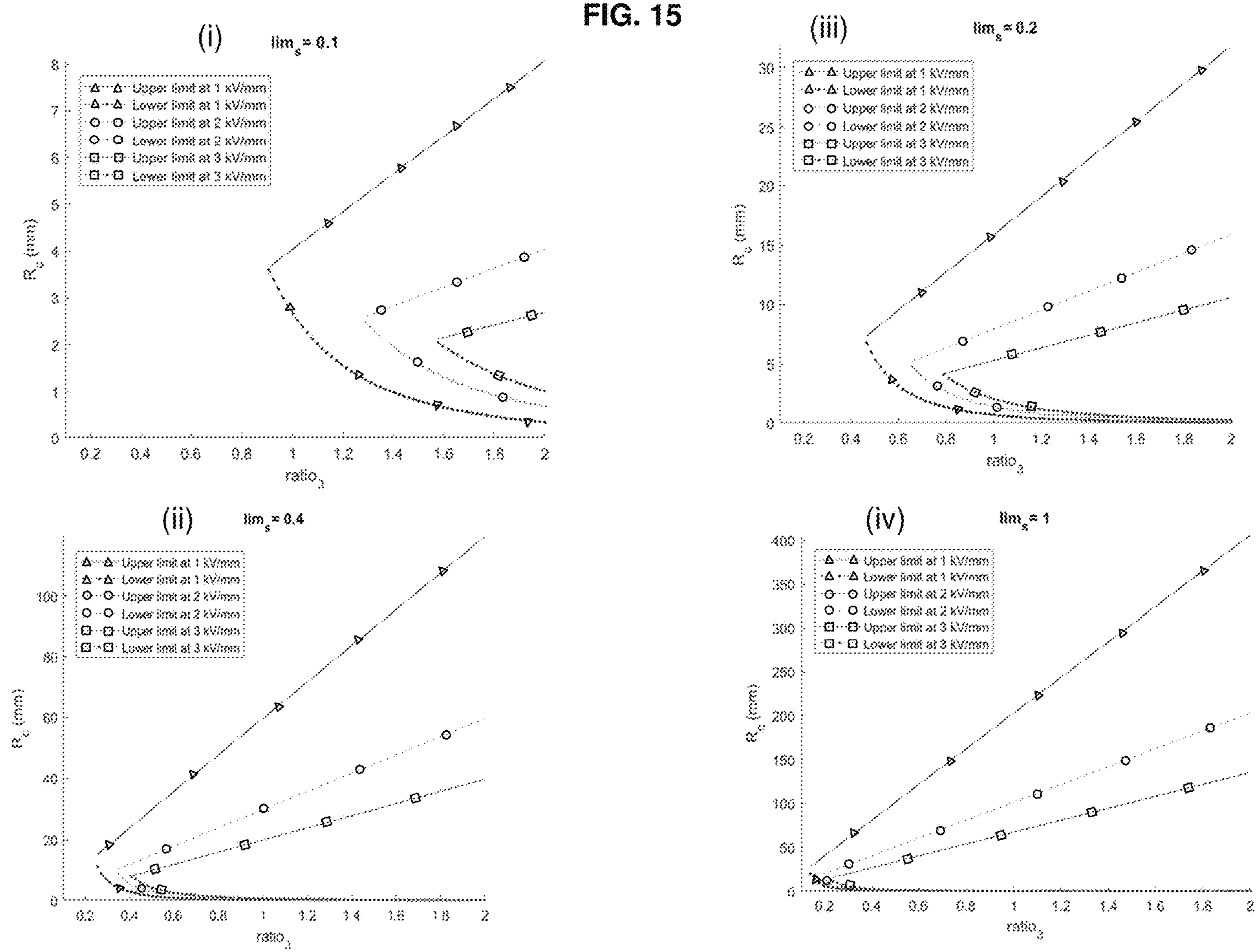
FIG. 15 illustrates plots of an example if the operating aerosol flow rate is derived from the maximum operating volume flux $\varphi_{max}$ then the upper and lower limits on collector plate radius (y-axis) over which the analytical model would be valid for different $ratio_3$ values (x-axis) for different sheath positions: (a) $lim_s$=0.1 (b) $lim_s$=0.2 (c) $lim_s$=0.4 (d) $lim_s$=1.

The analytical model is valid for the case where flow is laminar. Hence, for any given combination of L3 value and $ratio_3$ value, the operating flow rates can be adjusted such that the Reynold's number (Re) is within laminar limit. However, if we operate at the collection volume flux limit (which is related to velocity), and with Re<1800 (such that the flow is laminar), we have an upper limit of collector plate radius (L3) for various sheath flow positions ($lim_s$) and $ratio_3$. Some examples of the limit is shown in FIG. 15 if the system is made to operate at the volume flux limit ($\varphi_{max}$) where the upper limit is because of Reynolds number and the lower limit is to avoid particle impaction. As the volume flux limit is higher for higher electric field strength, three different operating electric field strengths are used to find the limits on the collector plate radius.

$$Re = \frac{4\rho Q}{\pi\mu D},$$

$$\text{where, } Q = \frac{\pi\varphi_{max}R_c^2}{lim_s^2(2 - lim_s^2)}, \text{ and } D = 2R_c(\text{ratio}_3)$$

Lower Limit on the Collector Plate Radius (L3) to have Negligible Impaction

The analytical model is valid for the case where particles are not impacting onto the surface. Hence, for any given combination of L3 value and $ratio_3$ value, the operating flow rates can be adjusted such that the Stokes number (St) is low (lower than 0.1 as then the impaction efficiency is lower than 1%). However, if we operate at the collection volume flux limit (which is related to velocity), and with St<0.1 (such that impaction is negligible), we have a lower limit of collector plate radius (L3) for various sheath flow positions ($lim_s$) and $ratio_3$. The examples in FIG. 15 have the lower limit to have negligible impaction (i.e. impaction efficiency around 1%) for particles with density of 1 g/cc and diameter 2.5 μm.

$$St = \frac{4\rho D_p^2 Q}{9\pi\mu D^3}$$

Materials

Various considerations in choosing exemplary materials for various parts of embodiments of the invention are presented below:

| Part | Required properties | Optional properties | Example materials |
|---|---|---|---|
| Inlet tube | Low static electricity affinity: To avoid local electric fields. Smooth inner surface: Flow profile should not be affected. | Conducting: Important when inner wall is in proximity of charged particles. | Steel, Aluminum, Copper, ABS, Polycarbonate, Nitrile Rubber, etc. |
| Tube electrode and counter-base electrode | High conductivity. Low corrosion potential: The material should not ablate considerably under high voltage. | Low thermal expansion: If the electrodes gets heated this can be useful to consider. | SS, Tungsten, Platinum, Gold, Silver, Copper, etc. |
| Base Electrode | High conductivity. Low corrosion potential: The material should not ablate considerably under high voltage nor degrade through galvanic corrosion. Low oxidation potential. | Low thermal expansion: If the electrodes gets heated this can be useful to consider. Very high thermal conductivity: As charge will flow through a solid-solid contact. | Gold, Nickle, Tin, Silver, etc. |
| Collector plate | Conductivity: A level of conductivity that can help carry away the charge from the deposited particles is required. Low corrosion potential: The material should not ablate considerably through the particles depositing on its surface. | | Highly dependent on the user. Most conductors, semiconductors (eg., Silicon, Zinc Selenide, Germanium), and some insulators might also be used. |
| Filler | Relative permittivity comparable to that of the collector plate material. | Conductivity: A level of conductivity that can help carry away the charge from the deposited particles is required | Wide range of materials possible ABS. |

-continued

| Part | Required properties | Optional properties | Example materials |
|---|---|---|---|
| Dielectric around counter-base and tube electrodes | Low conductivity: This would act as an insulation around the electrodes. | High relative permittivity: This would not dampen the electric field strength. | High-k dielectrics are preferable. Very thin layer of low-k dielectric would also find application. |

LITERATURE REFERENCES

1. Dixkens, J., & Fissan, H. (1999). Development of an electrostatic precipitator for off-line particle analysis. Aerosol Science and Technology, 30(5), 438-453. https://doi.org/10.1080/027868299304480
2. Preger, C., Overgaard, N. C., Messing, M. E., Magnusson, M. H., Preger, C., Overgaard, N. C., . . . Magnusson, M. H. (2020). Predicting the deposition spot radius and the nanoparticle concentration distribution in an electrostatic precipitator. Aerosol Science and Technology, 0(0), 1-11. https://doi.org/10.1080/02786826.2020.1716939
3. Rees, J. a. (1973). Chapter 5 Electrical breakdown in gases. High Voltage Engineering Fundamentals, V, 294. https://doi.org/10.1016/B978-0-7506-3634-6.50006-X
4. Heiszler, M. (1971). Dissertation. Iowa State University. Analysis of streamer propagation in atmospheric air. https://lib.dr.iastate.edu/cgi/viewcontent.cgi?article=5458&context=rtd
5. Han, T. T., Thomas, N. M., & Mainelis, G. (2017). Design and development of a self-contained personal electrostatic bioaerosol sampler (PEBS) with a wire-to-wire charger. Aerosol Science and Technology, 51(8), 903-915. https://doi.org/10.1080/02786826.2017.1329516
6. Jodzis, S., & Patkowski, W. (2016). Kinetic and Energetic Analysis of the Ozone Synthesis Process in Oxygen-fed DBD Reactor. Effect of Power Density, Gap Volume and Residence Time. Ozone: Science and Engineering, 38(2), 86-99. https://doi.org/10.1080/01919512.2015.1128320

LIST OF REFERENCES IN THE DRAWINGS

- Particle gas stream 3
- Sheath gas stream 5
- Particle collector 1
  - Particle charger 2
  - Inlet section 4
    - Flow tube 10
      - Flow channel 12
        - Guide wall 24
      - Inlet end 14
        - Sheath flow inlet portion 26
          - sheath flow gas inlet 27
          - gas chamber 29
          - sheath flow gas outlet 31
        - Particle inlet 28
      - Collector end 16
  - Collector section 6
    - Housing 18
    - Collector plate 20
      - Particle collection side 23
      - Underside 25
      - Transparent (e.g. crystal) disc
    - Collector plate holder 22
      - Filler material 21
    - Outlet 30
  - Electrode arrangement **8*a*, 8*b*, 8*c***
    - Base electrode (attracting electrode) **8*a***
    - Collector inlet electrode(s) (repulsing electrodes)
      - Counter-base electrode **8*b***
  - Tube electrode **8*c***
  - Cleaning system 7
    - Cleaning gas nozzle 17
    - Movable motorized platform 19
  - Measuring instrument 9
    - Light source (e.g. laser) 11
    - Light detector 13
  - Controller 41
    - Processor 43
    - Display 45
  - Inlet channel collector end radius L1
  - Counter-base electrode to collector plate separation distance L2
  - Collector plate radius L3
  - Collector plate filler radius L4
  - Particle stream radius (inner radius of sheath stream) r

The invention claimed is:

1. An ESP particle collector for collecting particles in a particle containing gas stream, comprising:

an inlet section, a collector section, and an electrode arrangement, the inlet section comprising a flow tube defining a gas flow channel therein bounded by a guide wall extending between an entry end and a collector end that serves as an inlet to the collector section, the entry end comprising an inlet for the particle gas stream and a sheath flow inlet portion for generating a sheath flow around the particle gas stream, the collector section comprising a housing coupled to the flow tube, and a collector plate mounted therein having a particle collection surface, wherein the ESP particle collector comprises an optical measuring instrument configured to transmit light through the collector plate along a centre axis (A) orthogonal or substantially orthogonal to the particle collection surface for optical analysis of the collector plate particle collection surface to measure particles collected thereon, wherein the flow tube has a bent portion such that the entry end is positioned out of the centre axis A to allow the light to be transmitted through the collector plate in the direction of the centre axis and to be picked up without interfering with the gas flow or the gas inlet, and wherein the flow tube comprises a first portion arranged along an initial inclined axis (Gi) connected via the bent portion to a second portion arranged along the centre axis (A) connected to the collector section, an angle of inclination (β) of the initial axis (Gi) relative to the centre axis (A) is less than 60°.

2. The ESP particle collector according to claim 1 wherein the angle of inclination (β) of the initial axis (Gi) relative to the centre axis (A) is less than 40°.

3. The ESP particle collector according to claim 1 wherein a length (d2) of the second portion of flow tube is in a range of 0.3D to 0.7D, D being the length of the first portion plus the second portion.

4. The ESP particle collector according to claim 1 wherein the optical measuring instrument comprises a spectroscopic optical instrument comprising a light source arranged to project light through the collector plate and a light detector arranged to capture the light transmitted through the collector plate from the light source.

5. An ESP particle collector for collecting particles in a particle containing gas stream, comprising:
- an inlet section,
- a collector section, and
- an electrode arrangement,
- the inlet section comprising a flow tube defining a gas flow channel therein bounded by a guide wall extending between an entry end and a collector end that serves as an inlet to the collector section,
- the entry end comprising an inlet for the particle gas stream and a sheath flow inlet portion for generating a sheath flow around the particle gas stream,
- the collector section comprising a housing coupled to the flow tube, and a collector plate mounted therein having a particle collection surface,
- wherein the ESP particle collector comprises an optical measuring instrument configured to transmit light through the collector plate along a centre axis (A) orthogonal or substantially orthogonal to the particle collection surface for optical analysis of the collector plate particle collection surface to measure particles collected thereon,
- wherein the flow tube has a bent portion such that the entry end is positioned out of the centre axis A to allow the light to be transmitted through the collector plate in the direction of the centre axis and to be picked up without interfering with the gas flow or the gas inlet, and
- wherein the ESP particle collector further comprises a cleaning system comprising one or more gas nozzles arranged to direct one or more jets of a cleaning gas on the collector plate particle collection surface.

6. The ESP particle collector according to claim 1 wherein the collector plate is mounted on a motorized movable platform to move the collector plate away from the measurement position for the cleaning operation.

7. An ESP particle collector for collecting particles in a particle containing gas stream, comprising:
- an inlet section,
- a collector section, and
- an electrode arrangement,
- the inlet section comprising a flow tube defining a gas flow channel therein bounded by a guide wall extending between an entry end and a collector end that serves as an inlet to the collector section,
- the entry end comprising an inlet for the particle gas stream and a sheath flow inlet portion for generating a sheath flow around the particle gas stream,
- the collector section comprising a housing coupled to the flow tube, and a collector plate mounted therein having a particle collection surface,
- wherein the ESP particle collector comprises an optical measuring instrument configured to transmit light through the collector plate along a centre axis (A) orthogonal or substantially orthogonal to the particle collection surface for optical analysis of the collector plate particle collection surface to measure particles collected thereon,
- wherein the flow tube has a bent portion such that the entry end is positioned out of the centre axis A to allow the light to be transmitted through the collector plate in the direction of the centre axis and to be picked up without interfering with the gas flow or the gas inlet, and wherein the ESP particle collector further comprises a purge gas source connected fluidically via a valve to the gas inlet, for instance the sheath gas flow inlet, configured to purge the inlet section and collector section gas flow channels prior to the measurement cycle.

8. An ESP particle collector for collecting particles in a particle containing gas stream, comprising:
- an inlet section,
- a collector section, and
- an electrode arrangement,
- the inlet section comprising a flow tube defining a gas flow channel therein bounded by a guide wall extending between an entry end and a collector end that serves as an inlet to the collector section,
- the entry end comprising an inlet for the particle gas stream and a sheath flow inlet portion for generating a sheath flow around the particle gas stream,
- the collector section comprising a housing coupled to the flow tube, and a collector plate mounted therein having a particle collection surface,
- wherein the ESP particle collector comprises an optical measuring instrument configured to transmit light through the collector plate along a centre axis (A) orthogonal or substantially orthogonal to the particle collection surface for optical analysis of the collector plate particle collection surface to measure particles collected thereon,
- wherein the flow tube has a bent portion such that the entry end is positioned out of the centre axis A to allow the light to be transmitted through the collector plate in the direction of the centre axis and to be picked up without interfering with the gas flow or the gas inlet, and wherein the ESP particle collector further comprises a controller connected to various devices of the ESP particle collector allowing the automated measurement of collected particles, said devices including some or all of: the particle charger; gas pumps such as for the particle gas flow, for the sheath gas flow, for the outlet; a purge gas valve, a motorized platform for moving the collector plate; a cleaning system; and the optical measuring instrument.

9. The ESP particle collector according to claim 1 comprising a pair of devices each having said inlet and collector sections and associated flow tubes, coupled optically to a common said measuring instrument.

10. The ESP particle collector according to claim 1 wherein the electrode arrangement comprises at least a base electrode positioned below the collection surface and a counter-base electrode positioned at a separation distance L2 above the collection surface such that an electrical field is generated between the electrodes configured to precipitate said particles on the collection surface, wherein the electric field is in a range of 0.1 kV per mm to 1.5 kV per mm, with an absolute voltage on any said electrode that is less than 10 kV, and wherein a ratio ratio_1 of a radius L1 of said inlet at the collector end divided by said separation distance L2 is in a range of 0.8 to 1.2.

11. The ESP particle collector according to claim 10 wherein a ratio_2 (L1/L4) of the radius L1 of said inlet divided by a radius L4 of the base electrode is less than 1.

12. The ESP particle collector according to claim 10 wherein a ratio $lim_s$ (Ls/L1) of an inner radius Ls of the said sheath flow relative to the inlet radius L1 is less than 0.6.

13. The ESP particle collector according to claim 1 wherein a ratio ratio_3 of the radius L1 of said inlet divided by a radius L3 of the collector plate (L1/L3) is in a range of 0.05 to 20.

14. The ESP particle collector according to claim 1 wherein the electrode arrangement further comprises a tube electrode around the collector end forming the inlet to the collector section.

15. The ESP particle collector according to claim 1 further comprising a particle charger arranged upstream of the inlet section configured to electrically charge the particles of the gas stream entering the inlet section, the particle charger configured to impart a charge on the particles contained in the gas stream in a range of about 1 elementary charge per 10 nm (1 nm=$10^{-9}$ m) to about 1 elementary charge per 50 nm diameter of a particle.

16. The ESP particle collector according to claim 11 wherein the ratio_2 (L1/L4) of the radius L1 of said inlet divided by the radius L4 of the base electrode is less than 0.7.

17. The ESP particle collector according to claim 16 wherein the ratio_2 (L1/L4) of the radius L1 of said inlet divided by the radius L4 of the base electrode is 0.5 or lower.

18. The ESP particle collector according to claim 12 wherein the ratio $lim_s$ (Ls/L1) of the inner radius Ls of the said sheath flow relative to the inlet radius L1 is in a range of 0.2 to 0.5.

19. The ESP particle collector according to claim 13 wherein the ratio ratio_3 of the radius L1 of said inlet divided by the radius L3 of the collector plate (L1/L3) is in a range of 0.1 to 5.

20. An ESP particle collector for collecting particles in a particle containing gas stream, comprising:
- an inlet section,
- a collector section, and
- an electrode arrangement,
- the inlet section comprising a flow tube defining a gas flow channel therein bounded by a guide wall extending between an entry end and a collector end that serves as an inlet to the collector section,
- the entry end comprising an inlet for the particle gas stream and a sheath flow inlet portion for generating a sheath flow around the particle gas stream,
- the collector section comprising a housing coupled to the flow tube, and a collector plate mounted therein having a particle collection surface,
- wherein the ESP particle collector comprises an optical measuring instrument configured to transmit light through the collector plate along a centre axis (A) orthogonal or substantially orthogonal to the particle collection surface for optical analysis of the collector plate particle collection surface to measure particles collected thereon,
- wherein the electrode arrangement comprises at least a base electrode positioned below the collection surface and a counter-base electrode positioned at a separation distance L2 above the collection surface such that an electrical field is generated between the electrodes configured to precipitate said particles on the collection surface,
- wherein the electric field is in a range of 0.1 kV per mm to 1.5 kV per mm, with an absolute voltage on any said electrode that is less than 10 kV,
- wherein a ratio ratio_1 of a radius L1 of said inlet at the collector end divided by said separation distance L2 is in a range of 0.8 to 1.2,
- wherein the flow tube has a bent portion such that the entry end is positioned out of the centre axis A to allow the light to be transmitted through the collector plate in the direction of the centre axis and to be picked up without interfering with the gas flow or the gas inlet, and
- wherein a ratio_2 (L1/L4) of the radius L1 of said inlet divided by a radius L4 of the base electrode is less than 1.

21. The ESP particle collector according to claim 10 wherein a ratio $lim_s$ (Ls/L1) of an inner radius Ls of the said sheath flow relative to the inlet radius L1 is less than 0.6.

22. An ESP particle collector for collecting particles in a particle containing gas stream, comprising:
- an inlet section,
- a collector section, and
- an electrode arrangement,
- the inlet section comprising a flow tube defining a gas flow channel therein bounded by a guide wall extending between an entry end and a collector end that serves as an inlet to the collector section,
- the entry end comprising an inlet for the particle gas stream and a sheath flow inlet portion for generating a sheath flow around the particle gas stream,
- the collector section comprising a housing coupled to the flow tube, and a collector plate mounted therein having a particle collection surface,
- wherein the ESP particle collector comprises an optical measuring instrument configured to transmit light through the collector plate along a centre axis (A) orthogonal or substantially orthogonal to the particle collection surface for optical analysis of the collector plate particle collection surface to measure particles collected thereon, and
- wherein the flow tube has a bent portion such that the entry end is positioned out of the centre axis A to allow the light to be transmitted through the collector plate in the direction of the centre axis and to be picked up without interfering with the gas flow or the gas inlet, and wherein a ratio ratio_3 of the radius L1 of said inlet divided by a radius L3 of the collector plate (L1/L3) is in a range of 0.05 to 20.

23. The ESP particle collector according to claim 1 wherein the ratio ratio_3 of the radius L1 of said inlet divided by the radius L3 of the collector plate (L1/L3) is in a range of 0.1 to 5.

* * * * *